(12) United States Patent
Xu et al.

(10) Patent No.: US 10,129,181 B2
(45) Date of Patent: Nov. 13, 2018

(54) CONTROLLING THE REACTIVE CACHING OF WILDCARD RULES FOR PACKET PROCESSING, SUCH AS FLOW PROCESSING IN SOFTWARE-DEFINED NETWORKS

(71) Applicants: Yang Xu, Livingston, NJ (US); H. Jonathan Chao, Holmdel, NJ (US)

(72) Inventors: Yang Xu, Livingston, NJ (US); H. Jonathan Chao, Holmdel, NJ (US)

(73) Assignee: New York University, New York, NY (US)

( * ) Notice: Subject to any disclaimer, the term of this patent is extended or adjusted under 35 U.S.C. 154(b) by 643 days.

(21) Appl. No.: 14/461,372

(22) Filed: Aug. 16, 2014

(65) Prior Publication Data
US 2016/0050148 A1    Feb. 18, 2016

(51) Int. Cl.
H04L 12/931    (2013.01)
H04L 12/851    (2013.01)
H04L 12/947    (2013.01)
H04L 12/715    (2013.01)
H04L 12/819    (2013.01)

(52) U.S. Cl.
CPC .............. *H04L 49/35* (2013.01); *H04L 45/64* (2013.01); *H04L 47/21* (2013.01); *H04L 47/24* (2013.01); *H04L 49/25* (2013.01)

(58) Field of Classification Search
None
See application file for complete search history.

(56) References Cited

U.S. PATENT DOCUMENTS

| 6,691,168 | B1* | 2/2004 | Bal | H04L 29/06 370/351 |
| 2002/0152209 | A1* | 10/2002 | Merugu | H04L 47/10 |
| 2010/0067535 | A1* | 3/2010 | Ma | H04L 43/028 370/401 |
| 2012/0254251 | A1* | 10/2012 | Barbosa | G06F 17/30938 707/797 |
| 2013/0218853 | A1* | 8/2013 | Bullis | H04L 41/0816 707/694 |
| 2014/0068196 | A1* | 3/2014 | Benoit | H04L 67/2852 711/135 |

* cited by examiner

*Primary Examiner* — Jeffrey M Rutkowski
*Assistant Examiner* — Mehedi Aley
(74) *Attorney, Agent, or Firm* — John C. Pokotylo; Pokotylo Patent Services

(57) ABSTRACT

Software-Defined Networking ("SDN") enables flexible flow control by caching policy rules at OpenFlow switches. Compared with exact-match rule caching, wildcard rule caching can better preserve the flow table space at switches. However, one of the challenges for wildcard rule caching is the dependency between rules, which is generated by caching wildcard rules overlapped in field space with different priorities. Failure to handle the rule dependency may lead to wrong matching decisions for newly arrived flows, or may introduce high storage overhead in flow table memory. A wildcard rule caching system, which may be used for SDN partitions the field space into logical structures called buckets, and caches buckets along with all the associated wildcard rules. Doing so resolves rule dependency while using control network bandwidth efficiently. Further, controller processing load and flow setup latency are reduced.

21 Claims, 18 Drawing Sheets

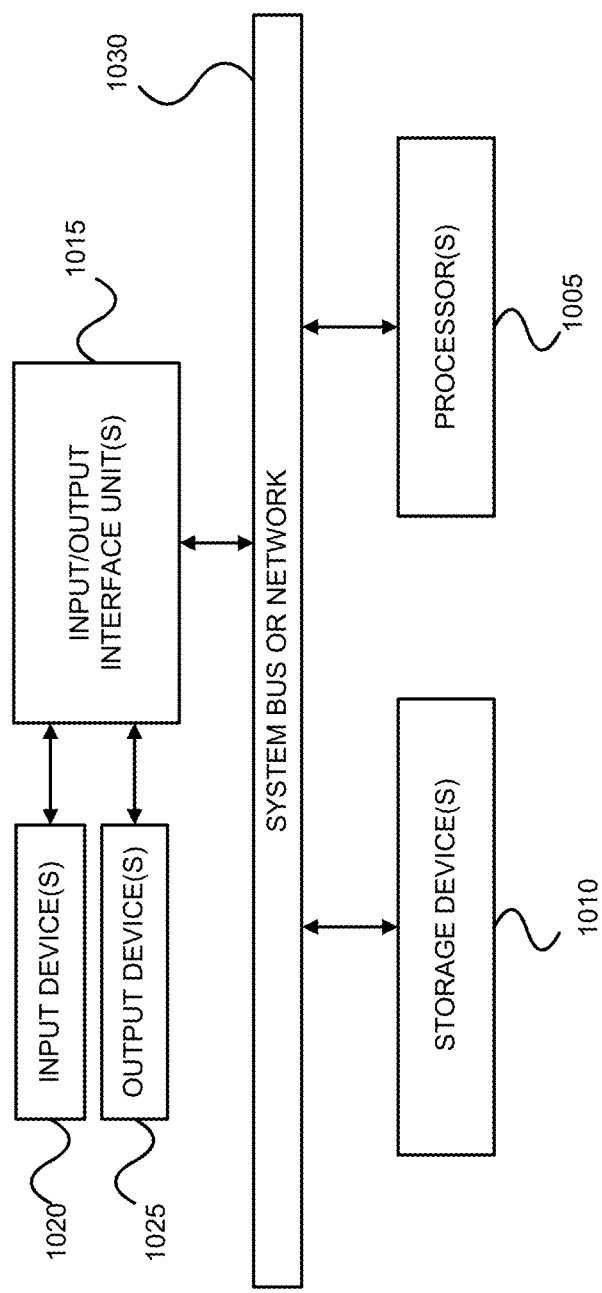

CONTROLLING THE REACTIVE CACHING OF WILDCARD RULES FOR PACKET PROCESSING, SUCH AS FLOW PROCESSING IN SOFTWARE-DEFINED NETWORKS

§ 1. BACKGROUND OF THE INVENTION

§ 1.1 Field of the Invention

The present invention concerns rules used in communications networks, such as the provision of wildcard rules in the flow table (or more generally, a packet processing table) of a software defined network ("SDN") switch.

§ 1.2 Background Information

Software-Defined Networking (SDN) enables network innovations and provides flexible flow control over network traffic. SDN proposes a variety of network policies for access control, traffic engineering, and energy efficiency to enhance the management of a communications network. These policies can be realized through the rules placed in the flow tables of SDN switches, such as open flow switches for example, to direct traffic forwarding.

Generally, a rule can be stored in the switch either as an exact-match rule (See, e.g., the article, M. Casado, M. J. Freedman, J. Pettit, J. Luo, N. Gude, N. McKeown, and S. Shenker, "Rethinking Enterprise Network Control," *IEEE/ACM Transactions on Networking (TON)*, Vol. 17, No. 4, pp. 1270 1283 (2009), and the article, A. R. Curtis, J. C. Mogul, J. Tourrilhes, P. Yalagandula, P. Sharma, and S. Banerjee Devoow, "Scaling Flow Management for High-Performance Networks," *ACM SIGCOMM Computer Communication Review*, Vol. 41, pp. 254-265 (ACM, 2011), both incorporated herein by reference.) or a wildcard rule (See, e.g., the article, N. McKeown, T. Anderson, H. Balakrishnan, G. Parulkar, L. Peterson, J. Rexford, S. Shenker, and J. Turner, "Openflow: Enabling Innovation in Campus Networks," *ACM SIGCOMM Computer Communication Review*, Vol. 38, No. 2, pp. 69-74 (2008), and the article, M. Yu, J. Rexford, M. J. Freedman, and J. Wang, "Scalable Flow-Based Networking with Difane," *ACM SIGCOMM Computer Communication Review*, Vol. 41, No. 4, pp. 351 362 (2011), both incorporated herein by reference.). Compared with exact-match rules, wildcard rules improve the reusability of rules in the flow table and reduce the number of flow setup requests to the controller, thereby enhancing the scalability of the system. However, wildcard rules are typically cached in Ternary Content Addressable Memory ("TCAM"), which is highly limited in capacity. The flow table in a commodity switch is reported to support only a few thousand wildcard rules. (See, e.g., the article, A. R. Curtis, J. C. Mogul, J. Tourrilhes, P. Yalagandula, P. Sharma, and S. Banerjee. Devoow, "Scaling Flow Management for High-Performance Networks," *ACM SIGCOMM Computer Communication Review*, Vol. 41, pp. 254-265 (ACM, 2011), incorporated herein by reference.) To improve scalability, recent studies suggest either proactively allocating rules on multiple switches to load balance the flow table consumption (See, e.g., the article, M. Moshref, M. Yu, A. Sharma, and R. Govindan, "Scalable Rule Management for Data Centers," *Proceedings of the 10th USENIX conference on Networked Systems Design and Implementation*, pp. 157 170 (USENIX Association, 2013), incorporated herein by reference.) or reactively caching rules (See, e.g., the article, A. R. Curtis, J. C. Mogul, J. Tourrilhes, P. Yalagandula, P. Sharma, and S. Banerjee. Devoow, "Scaling Flow Management for High-Performance Networks," *ACM SIGCOMM Computer Communication Review*, Vol. 41, pp. 254-265 (ACM, 2011), and the article, M. Yu, J. Rexford, M. J. Freedman, and J. Wang, "Scalable Flow-Based Networking with Difane," *ACM SIGCOMM Computer Communication Review*, Vol. 41, No. 4, pp. 351 362 (2011), both incorporated herein by reference.) on each switch. Compared with proactive schemes, the reactive approach dynamically caches active rules in switches on demand, which saves flow table space and enables rapid reaction to traffic dynamics.

Reactively caching wildcard rules in switches creates several challenges. First, the cache miss rate needs to be controlled to improve network performance. Packets suffering from a cache miss will experience a 2-ms latency compared to a 5-ns latency with a cache hit. (See, e.g., the article, A. R. Curtis, J. C. Mogul, J. Tourrilhes, P. Yalagandula, P. Sharma, and S. Banerjee. Devoow, "Scaling Flow Management for High-Performance Networks," *ACM SIGCOMM Computer Communication Review*, Vol. 41, pp. 254-265 (ACM, 2011), incorporated herein by reference.) A high cache miss rate also invokes frequent requests to the controller, and therefore causes control network bandwidth to be consumed. Second, dependency between rules complicates the caching process. More specifically, since rules with different priorities might overlap in field space, simply caching the requested rule can generate false packet forwarding (or more generally, erroneous packet processing). (See, e.g., the article, M. Yu, J. Rexford, M. J. Freedman, and J. Wang, "Scalable Flow-Based Networking with Difane," *ACM SIGCOMM Computer Communication Review*, Vol. 41, No. 4, pp. 351 362 (2011), incorporated herein by reference.) Extra storage overhead may be used to guarantee the semantic correctness of rules cached in switches. Unfortunately, however, this increases the chance of flow table overflow.

§ 2. SUMMARY OF THE INVENTION

The potential problem of erroneous packet processing due to wildcard rule dependency is solved in a way that reduces cache misses and flow table overflow by using a novel reactive wildcard rule caching system named CAching in Buckets ("CAB"). CAB (1) divides a D-dimensional representation of the rule set or the field space into many small logical structures called "buckets," and (2) associates each wildcard rule with one or more buckets according to its location in the field space. To ensure semantic correctness, wildcard rules associated with the same bucket are always cached together when the bucket is cached.

Example embodiments consistent with the present invention may guarantee correct packet matching to a set of wildcard rules for use in packet processing by a switch, while controlling a subset of the wildcard rules cached in the switch, by (1) receiving the set of wildcard rules, each of the wildcard rules having (i) a rule priority value and (ii) an associated D-dimensional area defined by a hyper-rectangle within a D-dimensional field space of packet header information, wherein D is at least 1; (2) partitioning the D-dimensional field space of packet header information into a plurality of D-dimensional hyper-rectangles, wherein each of the plurality of D-dimensional hyper-rectangles is represented by a bucket rule that can be stored in a switch cache memory; (3) for each of the wildcard rules and each of the bucket rules, determining whether or not there is a point in the D-dimensional hyper-rectangle defined by the bucket rule such that the wildcard rule is the highest priority rule covering the point; and (4) responsive to a determination that there is a point in the D-dimensional hyper-rectangle defined by the bucket rule such that the wildcard rule is the highest priority rule covering the point, associating the wildcard rule with the bucket rule, and otherwise, responsive to a determination that there is not a point in the D-dimensional hyper-rectangle defined by the bucket rule such that the wildcard rule is the highest priority rule covering the point, not associating the wildcard rule with the bucket rule. Then, example embodiments consistent with the present invention may process a received packet by (1) extracting header information from the received packet; (2) determining a location of the extracted header information in the D-dimensional field space; (3) determining whether or not any D-dimensional hyper-rectangle represented by any currently cached bucket rule includes the determined location of the extracted header information; and (4) responsive to a determination that there is no D-dimensional hyper-rectangle represented by any currently cached bucket rule that includes the determined location of the extracted header information (i) identifying a bucket rule representing the D-dimensional hyper-rectangle that includes the determined location, (ii) caching the identified bucket rule, (iii) caching any wildcard rules associated with the identified bucket rule, (iv) identifying a highest priority one of the cached wildcard rules that includes the determined location of the extracted header information, and (v) applying the identified highest priority one of the wildcard rules to the received packet to process the packet, and otherwise, responsive to a determination that any D-dimensional hyper-rectangle represented by any currently cached bucket rule includes the determined location of the extracted header information, (i) identifying a highest priority one of the cached wildcard rules that includes the determined location of the extracted header information, and (ii) applying the identified highest priority one of the wildcard rules to the received packet to process the packet.

§ 3. BRIEF DESCRIPTION OF THE DRAWINGS

FIG. 1 illustrates traffic locality exploited by example embodiments consistent with the present invention.

FIGS. 2(a)-2(d) illustrate wildcard rule dependency.

FIGS. 3(a) and 3(b) illustrate the use of bucket rules to partition a field space.

Figure 7A:
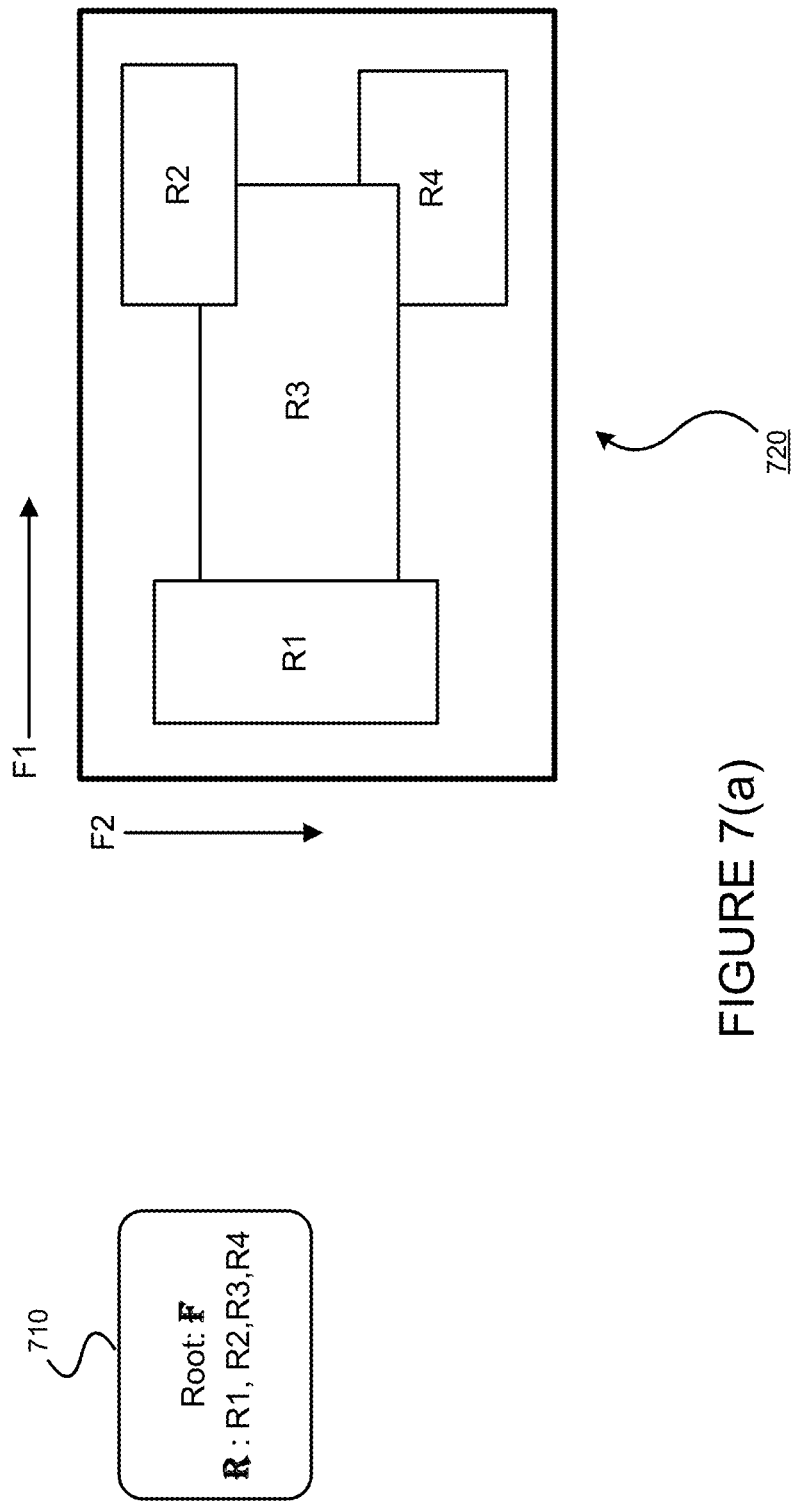
Figure 7B:
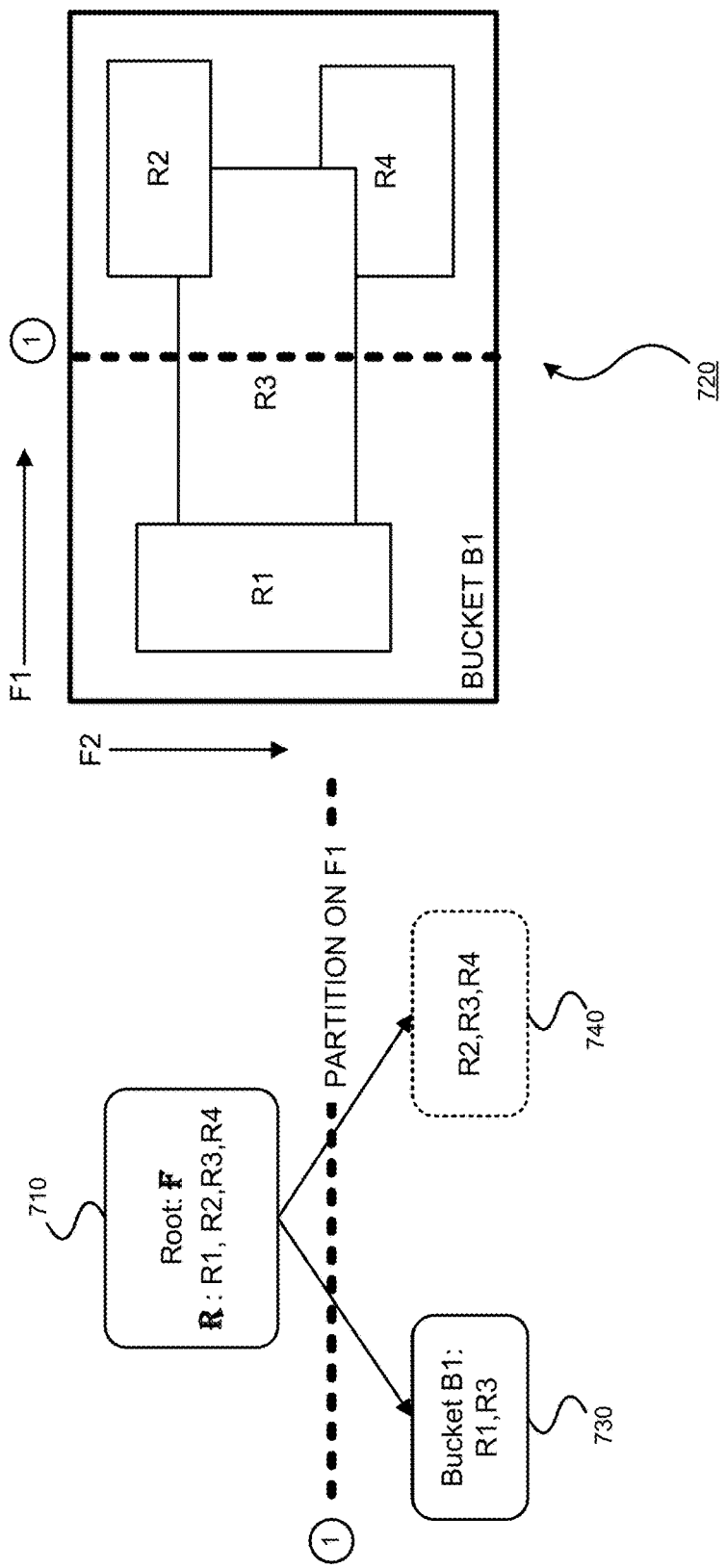
Figure 7C:
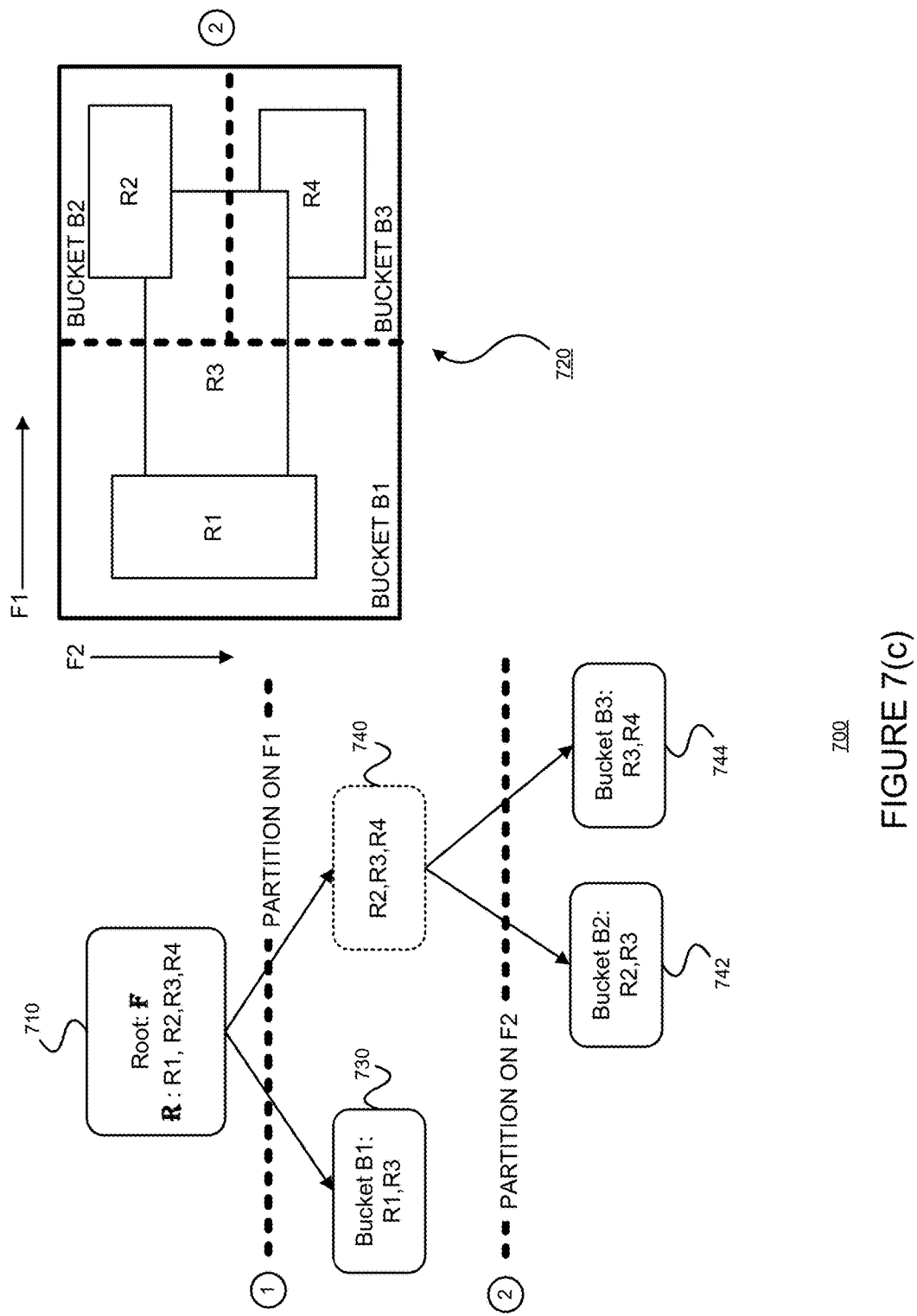

FIGS. 7(a)-7(c) illustrate the use of a decision tree in a bucket generating process consistent with the present invention.

Figure 8:
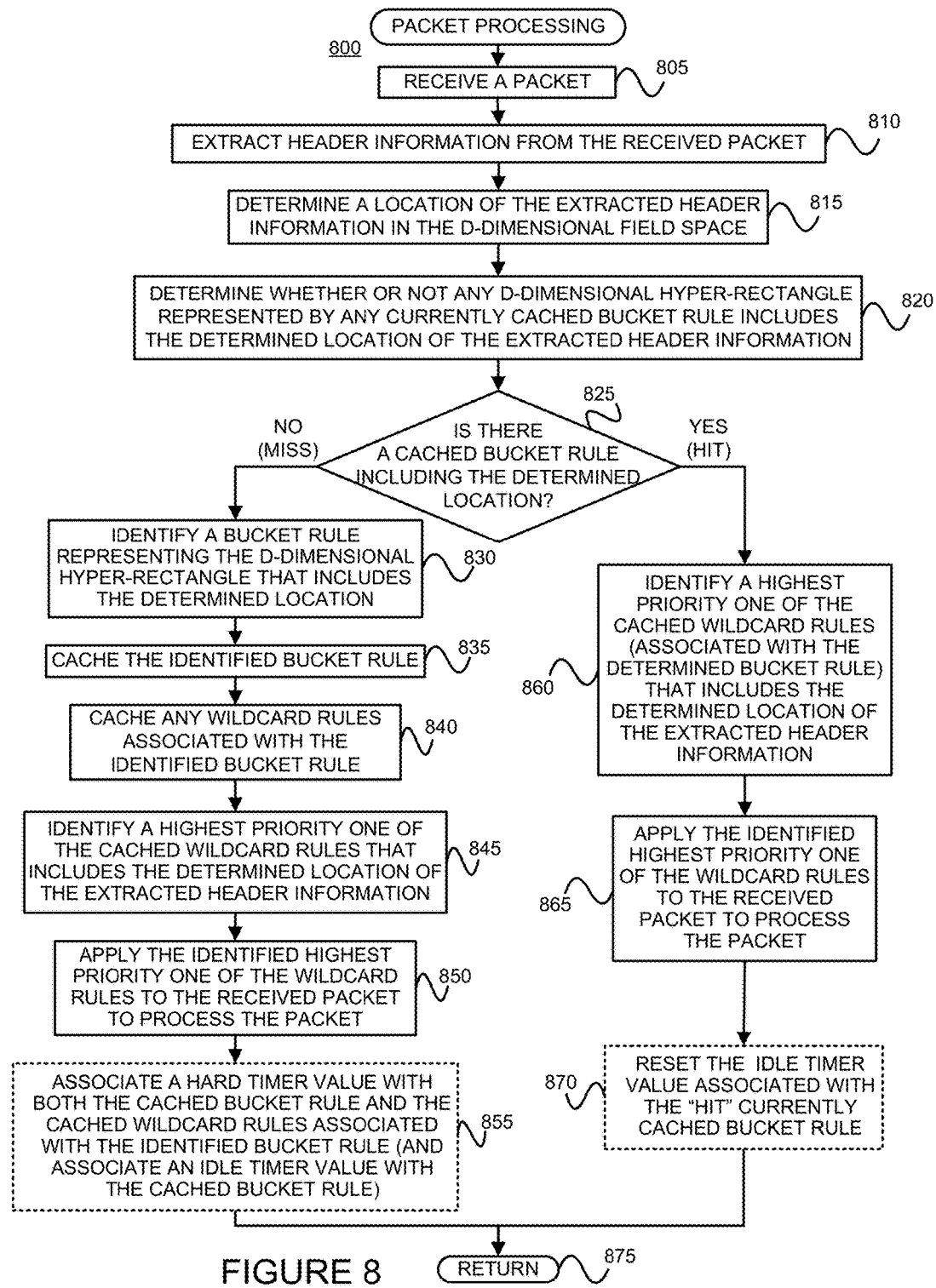

FIG. 8 is a flow diagram of an example method for packet processing (with wildcard rule cache control) in a manner consistent with the present invention.

Figure 9:
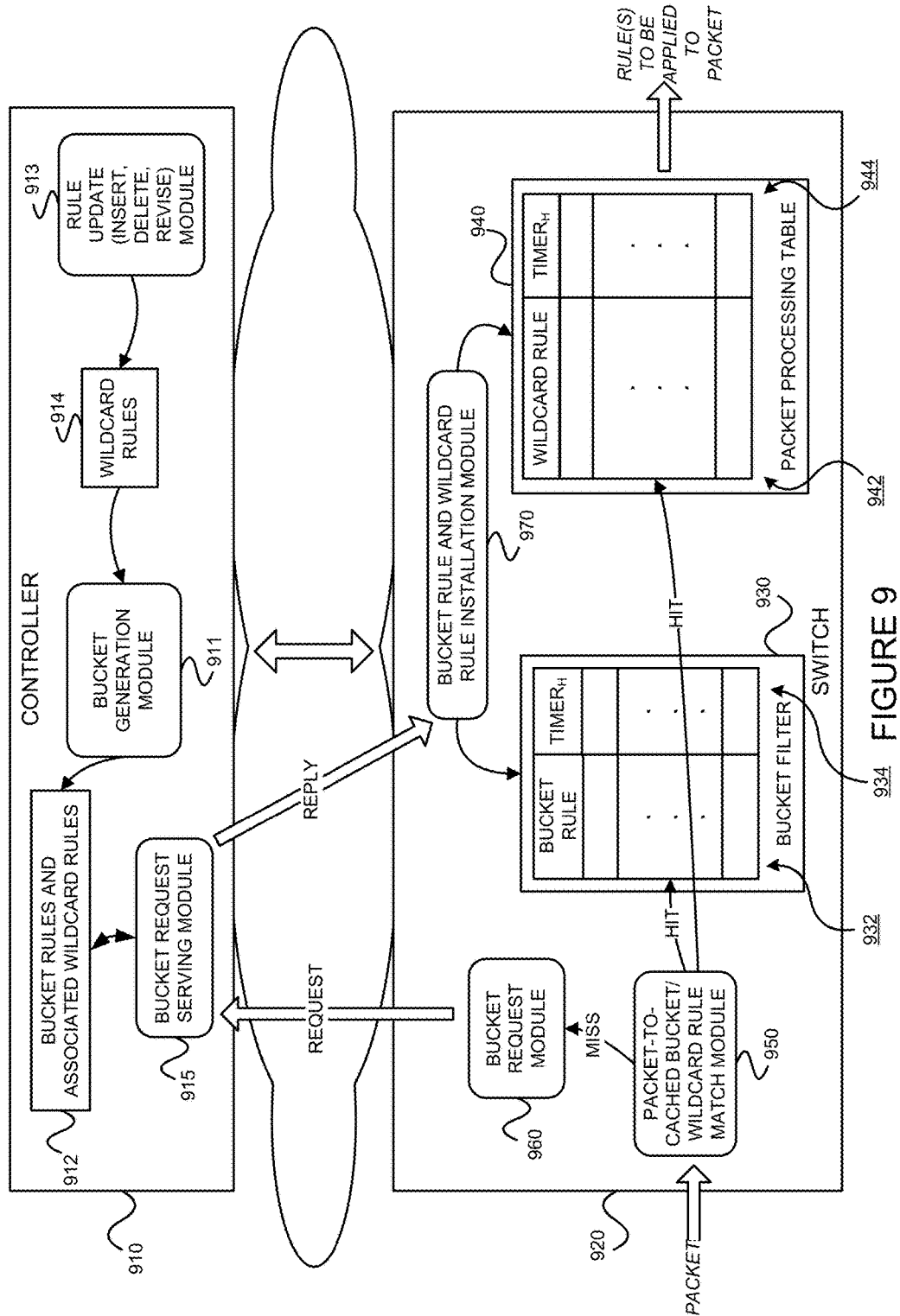

FIG. 9 is a block diagram of an example system 900 for implementing example methods consistent with the present invention.

FIG. 10 is a block diagram of an exemplary machine that may be used to implement various modules, perform various operations, and store various information generated and/or used by such modules and operations, in a manner consistent with the present invention.

Figure 11A:
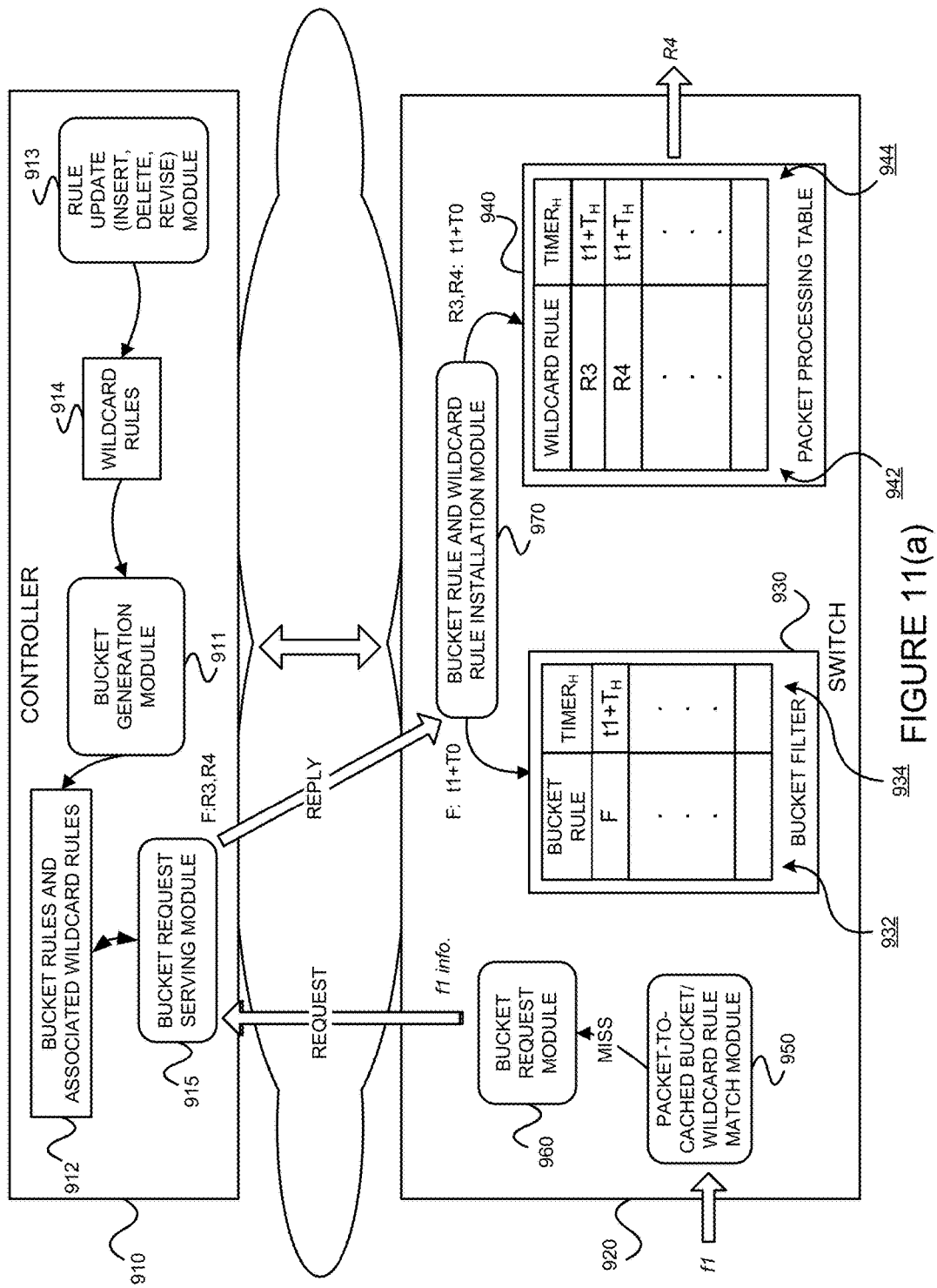
Figure 11B:
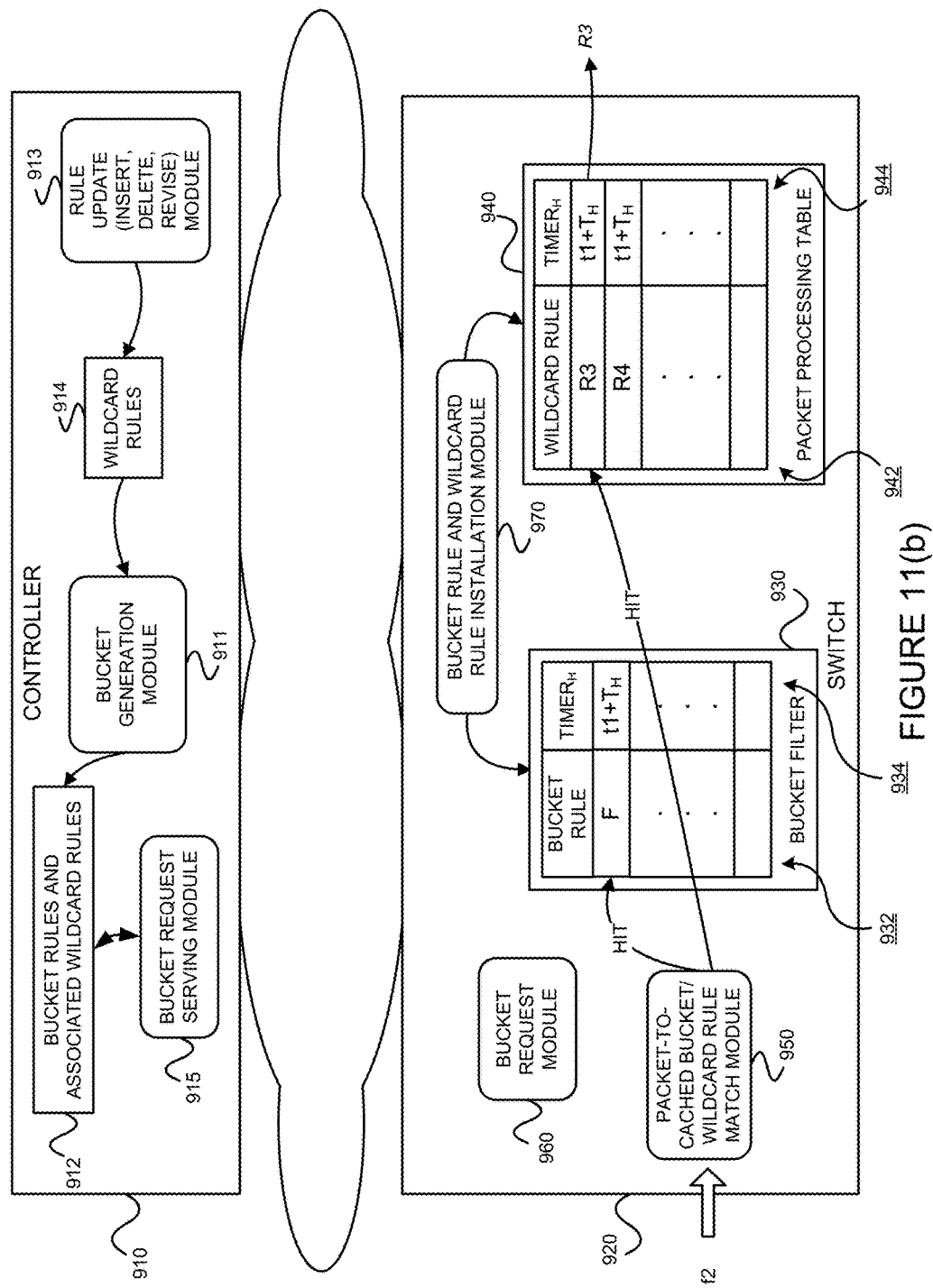
Figure 11C:
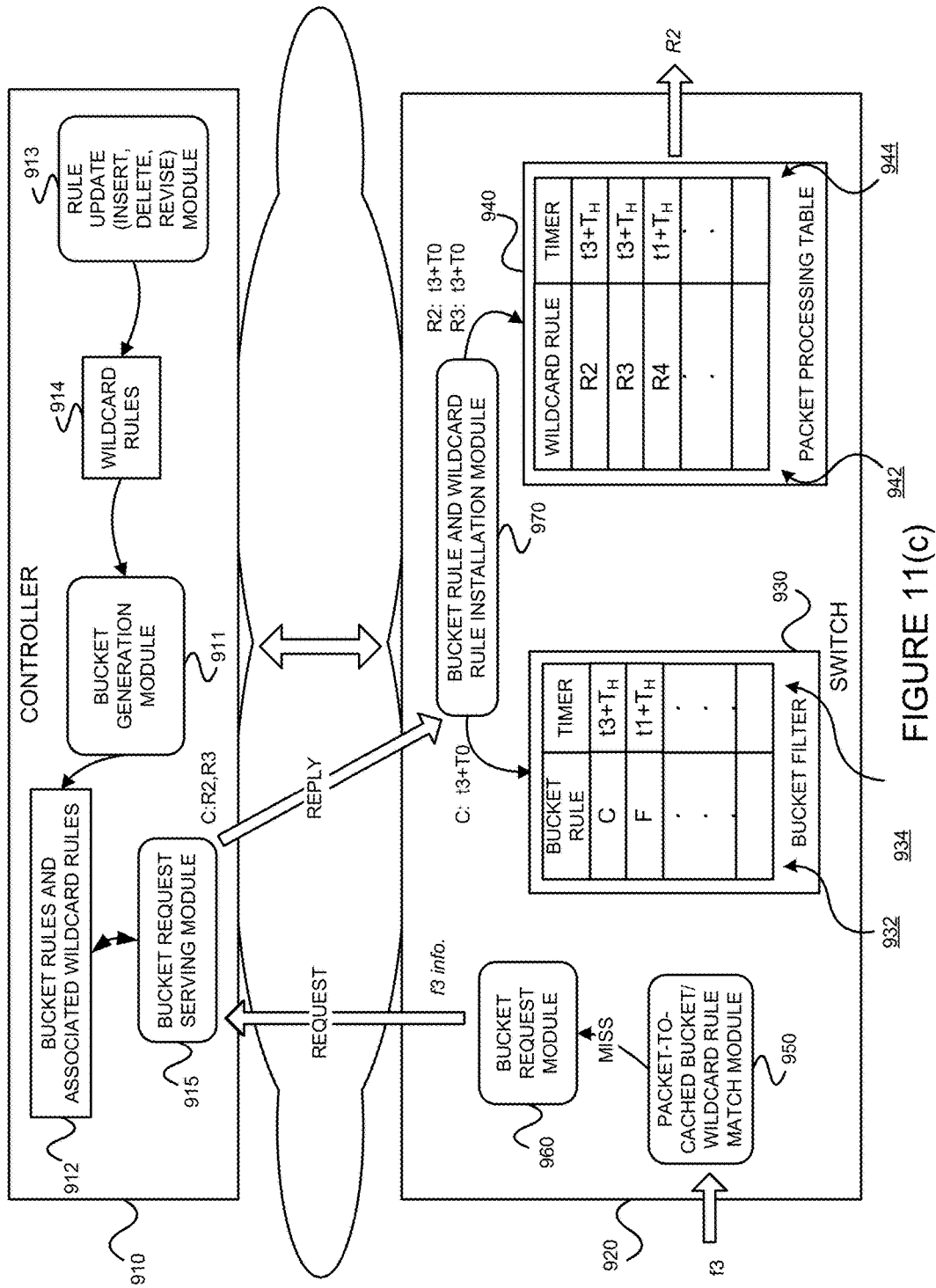

FIGS. 11(a)-11(c) illustrate an example of operation of example methods for packet processing with wildcard rule cache control.

Figure 12:
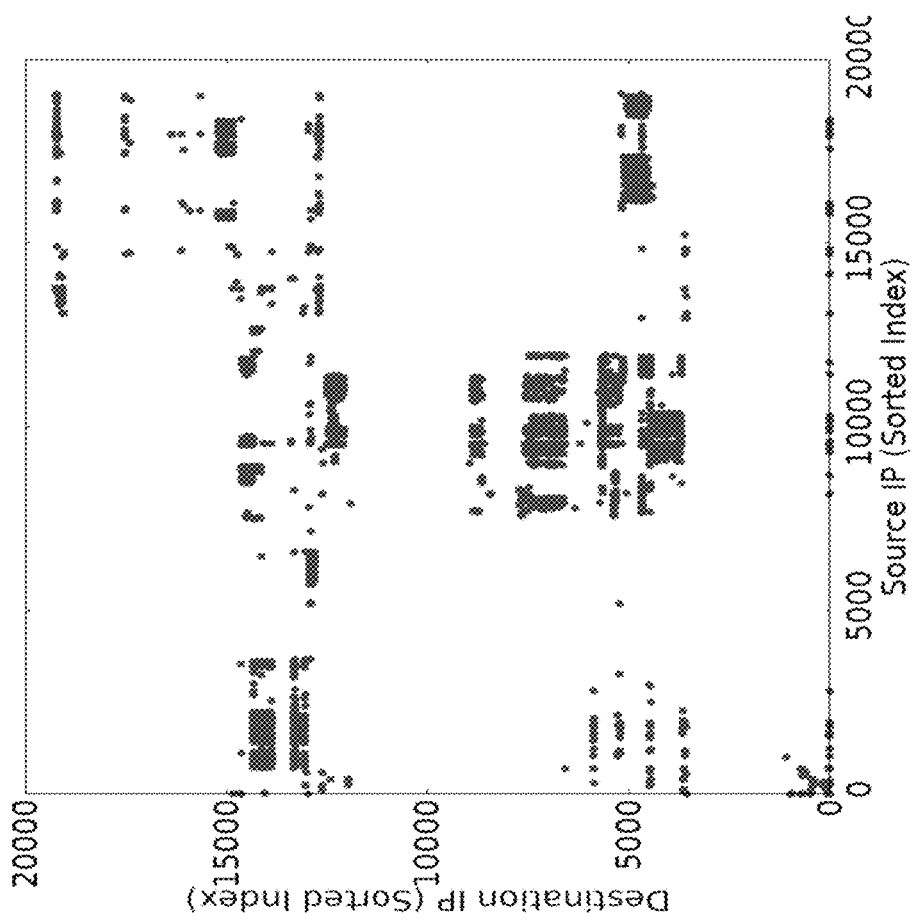

FIG. 12 illustrates synthetic trace generation used in simulations.

Figure 13:
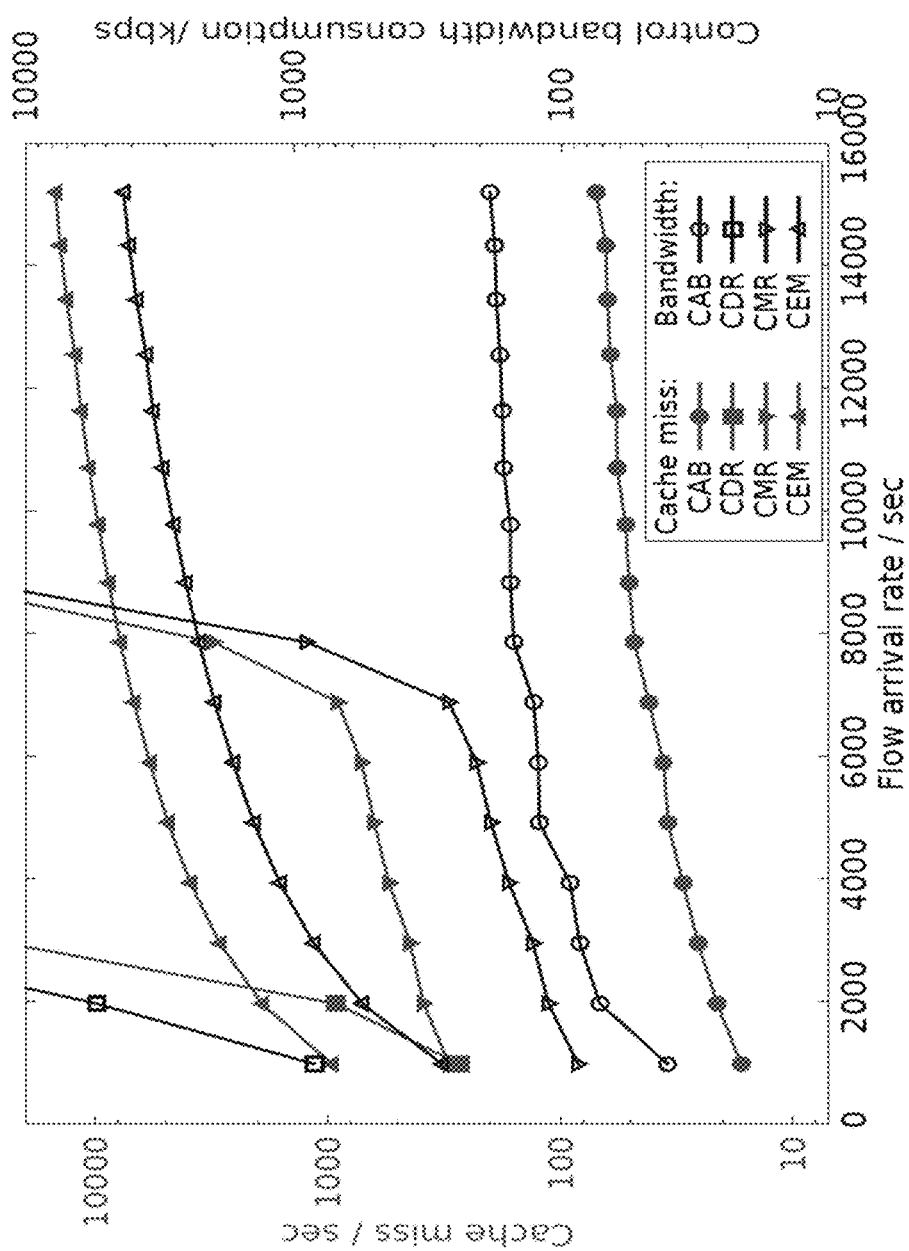

FIG. 13 is a graph illustrating resource consumption of various rule caching schemes.

Figure 14:
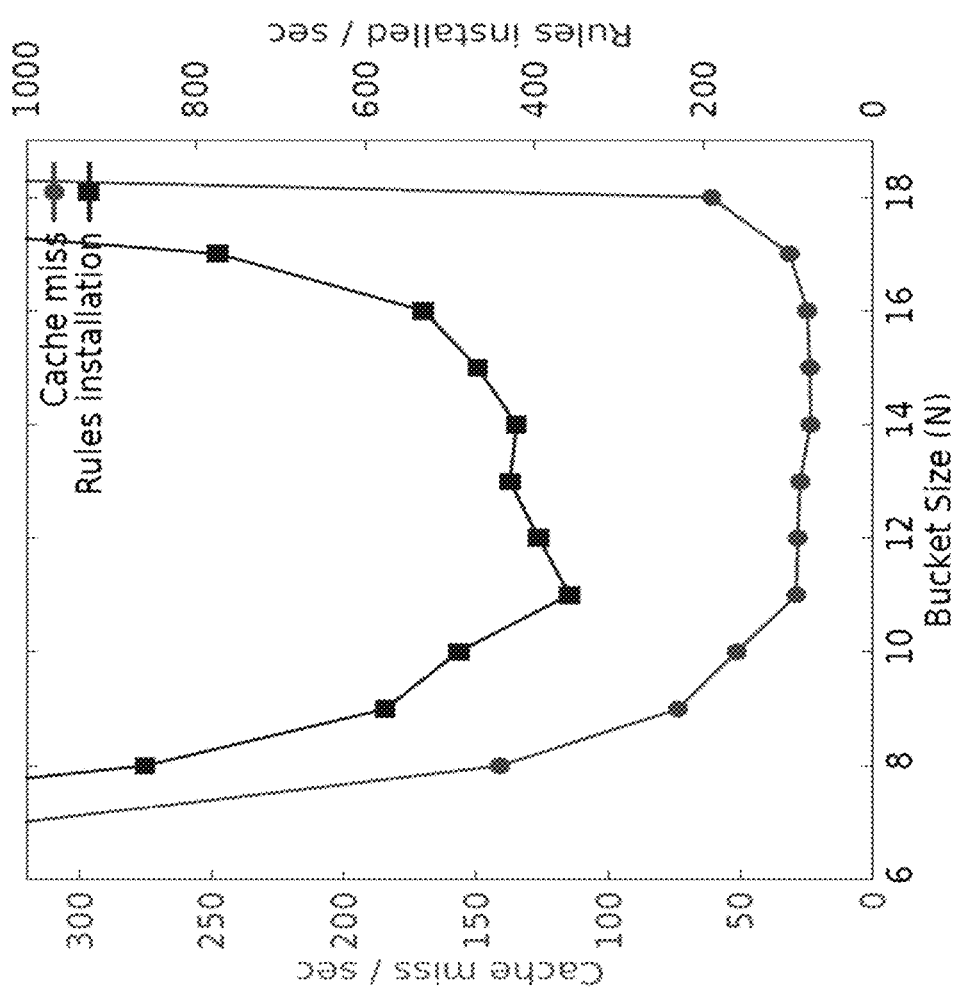

FIG. 14 is a graph illustrating the effect of bucket size on cache miss and rule installation rates.

§ 4. DETAILED DESCRIPTION

The present invention may involve novel methods, apparatus, message formats, and/or data structures for caching wildcard rules that may overlap (also referred to as "wildcard rule dependency"), in which case, priority might need to be used to determine which of the overlapping wildcard rules to apply. The following description is presented to enable one skilled in the art to make and use the invention, and is provided in the context of particular applications and their requirements. Thus, the following description of embodiments consistent with the present invention provides illustration and description, but is not intended to be exhaustive or to limit the present invention to the precise form disclosed. Various modifications to the disclosed embodiments will be apparent to those skilled in the art, and the general principles set forth below may be applied to other embodiments and applications. For example, although a series of acts may be described with reference to a flow diagram, the order of acts may differ in other implementations when the performance of one act is not dependent on the completion of another act. Further, non-dependent acts may be performed in parallel. No element, act or instruction used in the description should be construed as critical or essential to the present invention unless explicitly described as such. Also, as used herein, the article "a" is intended to include one or more items. Where only one item is intended, the term "one" or similar language is used. Thus, the present invention is not intended to be limited to the embodiments shown and the inventors regard their invention as any patentable subject matter described.

§ 4.1 Terminology and Definitions

§ 4.1.1 Traffic Locality

The existence of "traffic locality" in a variety of network scenarios motivates caching wildcard rules instead of exact-match rules. The term "traffic locality" is used to describe a situation in which, during a short period of time, in field space, traffic is localized in close proximity. "Field space" is defined as a packet classification space. For example, packets can be classified based on their IP Source, IP Destination pair, although various other layer 2, layer 3, layer 4 and/or layer 7 fields may be used instead, or in addition.

Figure 1:
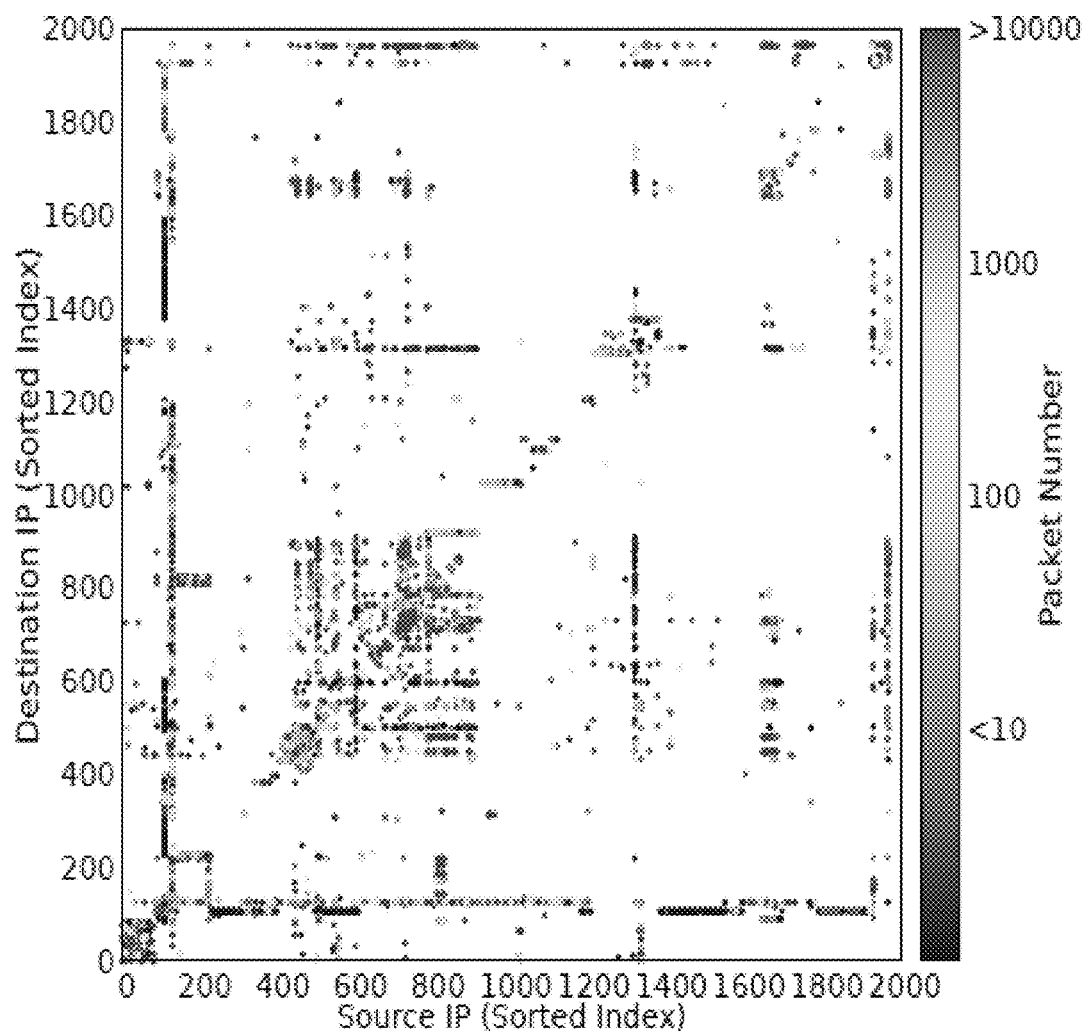

The present inventors analyzed traffic traces from a working enterprise data center from New York City Department of Education (NYCDoE-DC). The host pairs of the traces on a core-to-aggregate link of a switch with a duration of 5 minutes are plotted in FIG. 1. Notice that most traffic is localized in several blocks (that is, within several 2-dimensional rectangles). Similar evidence of traffic locality has been observed by previous studies in data centers (See, e.g., the article, X. Meng, V. Pappas, and L. Zhang, "Improving the Scalability of Data Center Networks with Traffic-Aware Virtual Machine Placement," *INFOCOM, 2010 Proceedings IEEE*, pp. 1-9 (IEEE, 2010), incorporated herein by reference.) and ISP networks (See, e.g., the article, Q. Dong, S. Banerjee, J. Wang, and D. Agrawal, "Wire Speed Packet Classification Without TCAMs: A Few More Registers (and a Bit Of Logic) are Enough," *ACM SIGMETRICS Performance Evaluation Review*, Vol. 35, pp. 253 264 (ACM, 2007), incorporated herein by reference.). If exact-match rules were cached, almost every flow passing the switch would trigger a rule installation request to the controller. In scenarios such as NYCDoE-DC, the number of new requests generated amounts to 2000 per port per second. Previous work reports that there can be up to 200k flow setup requests for a 4000-server cluster. (See, e.g., the article, A. Tootoonchian, S. Gorbunov, Y. Ganjali, M. Casado, and R. Sherwood, "On Controller Performance in Software-Defined Networks," *USENIX Workshop on Hot Topics in Management of Internet, Cloud, and Enterprise Networks and Services*, (Hot-ICE, 2012), incorporated herein by reference.) Caching exact-match rules easily overwhelms the controllers' ability to process requests and exhausts the limited control network bandwidth.

By contrast, caching wildcard rules can exploit the existence of traffic locality to reduce cache misses. The flows in "hot" blocks in traces may share the same wildcard rules or neighboring ones. Each cached wildcard rule can be re-used frequently within short periods of time. Since flows referring to the same wildcard rule generate, in the aggregate, one single request to the controller, the controller load and control bandwidth consumption are effectively reduced. Therefore, the present inventors believe using wildcard rules is generally better than using exact match rules. However, using wildcard rules raises the possibility of a wildcard rule overlap problem (also referred to as a "wildcard rule dependency problem"), discussed in the next section.

§ 4.1.2 Rule Overlap (Dependency) Problem

Figure 2B:
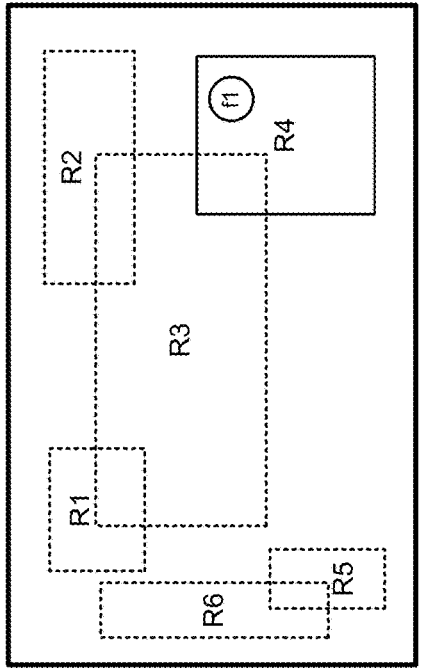
Figure 2D:
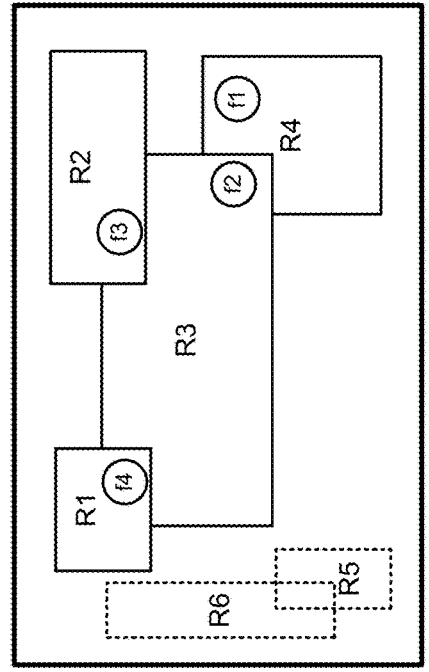
Figure 2A:
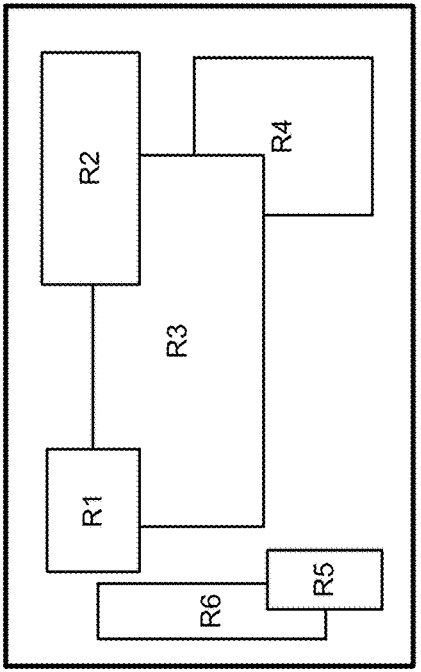
Figure 2C:
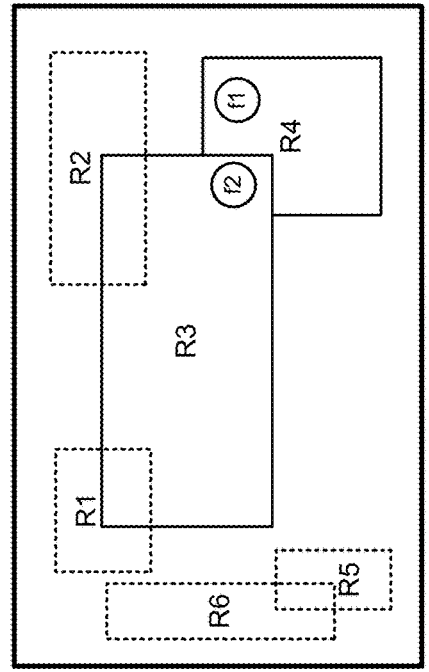

Since wildcard rules may overlap in the field space, they are assigned different priorities to avoid conflicts. However, this generates a problem for rule caching. More specifically, to guarantee semantic correctness of packet matching, extra memory cost is introduced to the flow table to store (higher priority) wildcard rules having some overlap in the field space. This, in turn, increases the chance of flow table overflow. To demonstrate the problem of wildcard rule overlap, consider a rule set with six wildcard rules (R1-R6) over a two dimensional field space as illustrated in FIG. 2(a). Assume that the flow table for a certain switch is initially empty. Referring to FIG. 2(b), when the first flow f1 arrives, the switch invokes a controller to install the corresponding rule 4 (FIG. 2(b)). However, simply installing rule R4 has the potential to cause improper matching decisions at the switch later. For example, referring to FIG. 2(c), suppose another flow f2 arrives at the switch later and hits the field space where rules R3 and R4 overlap. Flow f2 will locally match with rule R4 when it should have matched higher priority rule R3 (because rule 3 was not yet cached in the switch). To avoid this potential problem, when caching rule R4, the switch should also cache higher priority rule R3 (since rule R3 has some overlap with rule R4 in the field space) to guarantee correct matching in the future. However, if rule R3 is to be cached, rules R1 and R2 also need to be cached (since they have a higher priority and partly overlap in field space with rule R3). Otherwise, referring to FIG. 2(d), flows f3 and f4 will be improperly matched in the switch with rule R3 when they should be matched with rules R2 and R1, respectively. As should be appreciated from the foregoing, rules R1-R3 need to be cached whenever rule R4 is cached, regardless of the future flow arrivals (because rule R3 has higher priority and overlaps with rule R4, and because rules R1 and R2 have higher priorities than rule R3 and overlap with rule R3), rule R3 is said to be a "directly dependent" rule of rule R4. Rules R1 and R2 are said to be "directly dependent" rules of rule R3, and "indirectly dependent" rules of rule R4

If one were to proceed in a naive way, due to rule dependency, all the dependent rules (directly or indirectly) need to be cached along with a requested rule. Using rule sets generated by Classbench (See, e.g., the article, D. E. Taylor and J. S. Turner, "Classbench: A Packet Classification Benchmark," *INFOCOM* 2005. *24th Annual Joint Conference of the IEEE Computer and Communications Societies. Proceedings IEEE*, Vol. 3, pp. 2068 2079 (IEEE, 2005), incorporated herein by reference.), the present inventors found that the average number of dependent rules reaches up to 350 for each rule for a set with 8,000 rules. In the worst case, the default rule (that is, the wildcard rule to be used whenever there is no other matching rule for a given packet) is dependent on all the rules (which amounts to the size of the whole set). As should be appreciated from the foregoing, caching all dependent rules of a matched rule can easily overflow the switch flow table, and is therefore considered infeasible.

Another approach to resolve wildcard rule dependency is to convert rules to new micro rules which do not overlap. (See, e.g., the article, Q. Dong, S. Banerjee, J. Wang, and D. Agrawal, "Wire Speed Packet Classification Without TCAMs: A Few More Registers (and a Bit Of Logic) are Enough," *ACM SIGMETRICS Performance Evaluation Review*, Vol. 35, pp. 253 264 (ACM, 2007), and the article, M. Yu, J. Rexford, M. J. Freedman, and J. Wang, "Scalable Flow-Based Networking with Difane," *ACM SIGCOMM Computer Communication Review*, Vol. 41, No. 4, pp. 351 362 (2011), both incorporated herein by reference.) However, since each rule has tens of overlapped rules on average, slicing them into non-overlapping micro rules generates quite a lot of flow table entries. This tends to increase the number of entries cached in the flow table, which, in turn, increases the chance of overwhelming the TCAM memory in the switch and adds complexity for the controller to store and update the rules.

Figure 3A:
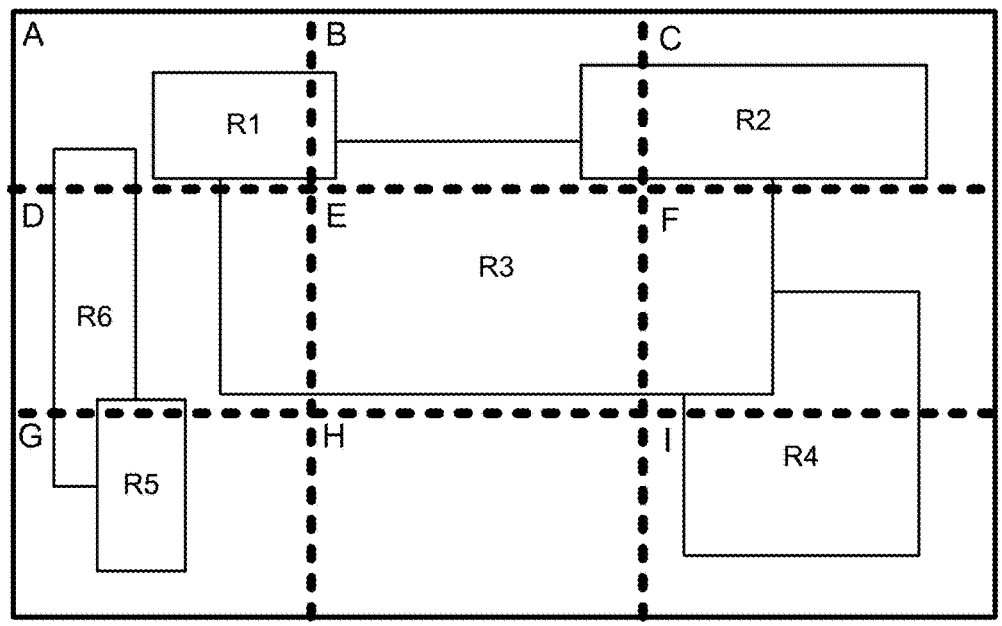
Figure 3B:
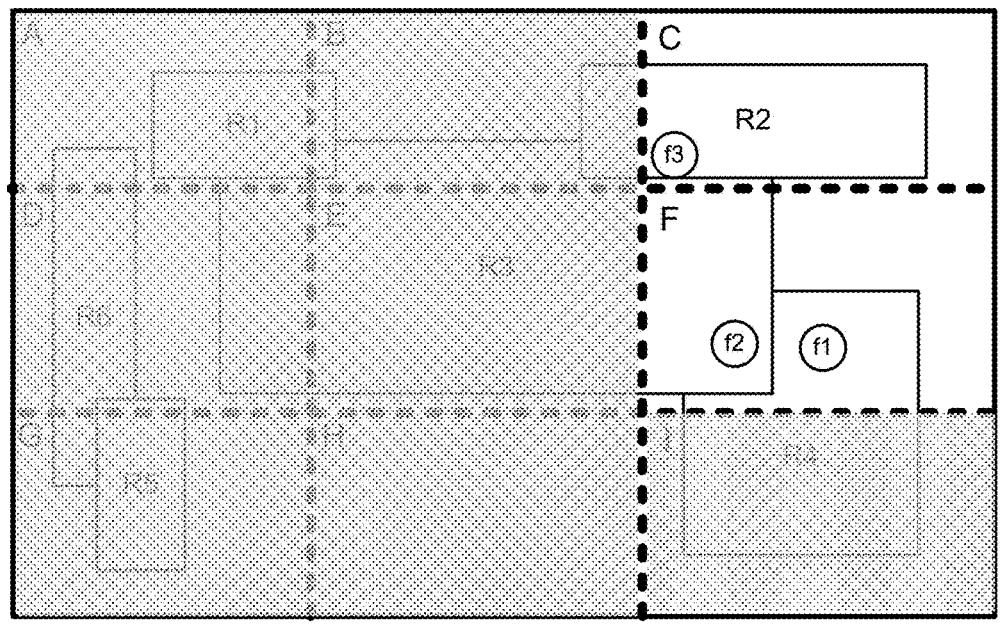

The present inventors have solved the wildcard rule dependency problem without modifying the original rule set. More specifically, example embodiments consistent with the present invention (1) partition the D-dimensional (where D is at least one) field space of packet header information into small D-dimensional hyper-rectangles (referred to as "buckets") (See, e.g., FIGS. 3(a).) and (2) cache the buckets together with their associated wildcard rules. The buckets define a filtering structure which guarantees correct packet matching and reduces the number of wildcard rules necessary to be cached in the switch. Each bucket can itself be represented by a wildcard rule (referred to as a "bucket rule," or simply a "bucket") that can be stored in the switch's cache memory (e.g., TCAM). A wildcard rule is said to be "associated with" a certain bucket if there is a point in the D-dimensional hyper-rectangle defined by the bucket rule such that the wildcard rule is the highest priority wildcard rule covering the point. Whenever a bucket request (e.g., a flow setup request) arrives, a controller determines the requested bucket rule and caches it, along with all the associated wildcard rules, onto the switch. Referring to FIG. 3(b) for example, Bucket C is cached with wildcard rules R2 and R3, while Bucket F is cached with wildcard rules R3 and R4. Note that within each bucket, the wildcard rules have the same semantic views as in the controller. This means that if there is a future packet coming which falls into the space represented by the bucket rule, the matching results made by the switch based on the cached associated wildcard rules will be identical to those made by the controller based on the complete rule set. If a received packet fails to "hit" a currently cached bucket rule, an installation to satisfy the request will be triggered. Therefore, the switch can always guarantee correct forwarding of packets and resolve the rule dependency problem.

Using buckets provides several other benefits in terms of memory cost. First, buckets can be used to control the wildcard rules installed for each request. As shown in FIG. 3(b), for f1 only wildcard rules R3 and R4 (which are associated with bucket F) need to be cached (together with caching bucket F), instead of having rule R4 and all its dependent wildcard rules (i.e., wildcard rules R1-R3) cached at one time. Second, by caching neighboring rules in buckets provides benefits due to traffic locality. For example, as f1 and f2 approach in proximity, f1 generates only one request to install bucket F (and its associated wildcard rules). Later, f2 can be forwarded at the line rate without generating a request to the controller or experiencing a setup latency because it uses wildcard rule R3 of bucket F, both of which should be currently cached. Third, in some example embodiments consistent with the present invention, all wildcard rules are cached in their original form (for example, without being split). This avoids generating too many micro rules, which would otherwise consume a lot of flow table memory. However, the present invention is not limited to this, and at least some wildcard rules may be split.

Figure 4:
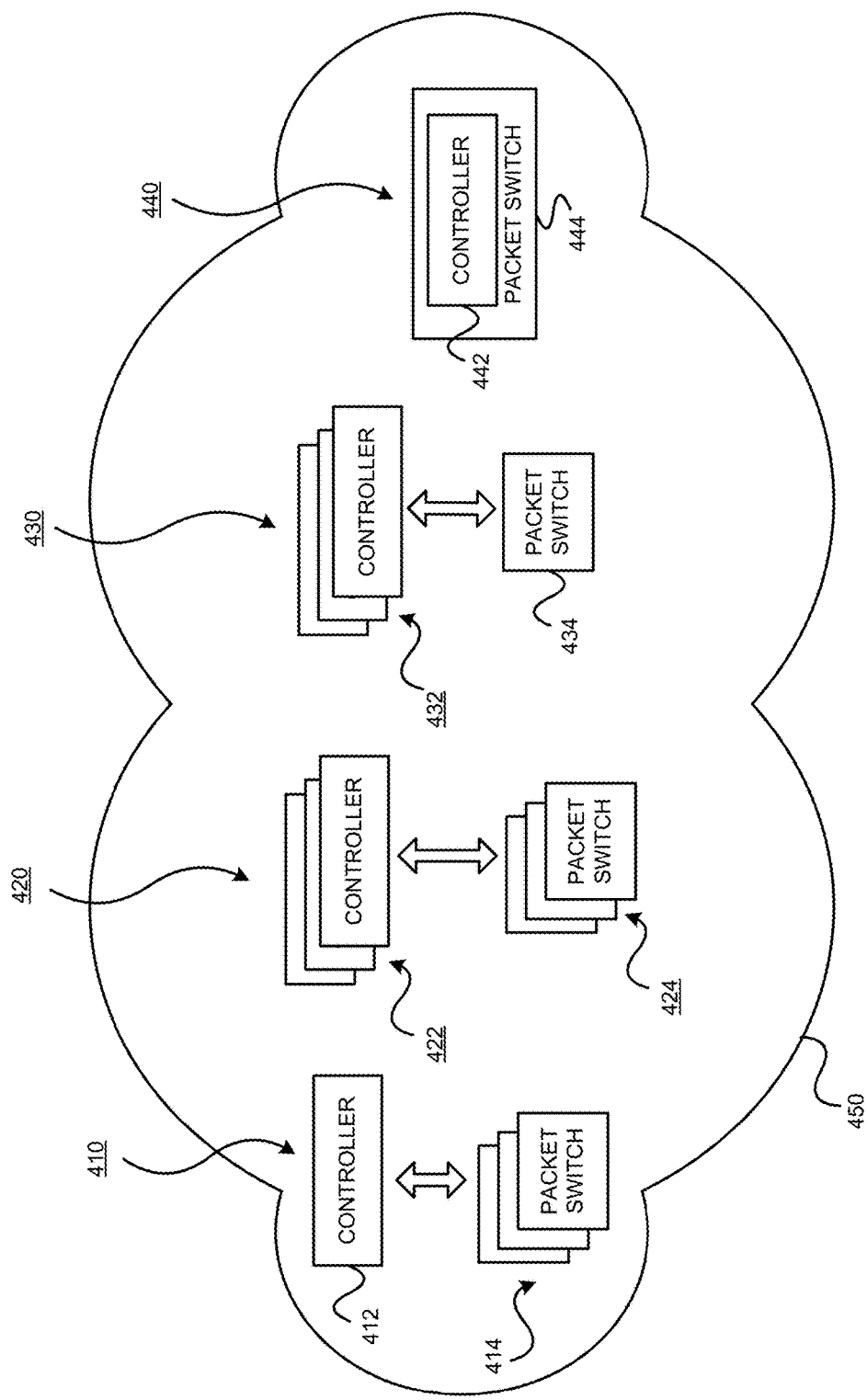
FIG. 4 illustrates an example environment in which various example embodiments consistent with the present invention may be used.

§ 4.2 Example Environment in which Embodiments Consistent with the Present Invention May Operate FIG. 4 illustrates an example environment 400 in which various example embodiments consistent with the present invention may be used. The example embodiments may be used in a communications network 450, such as the internet for example. In each of the following examples, a packet switch (such as a software defined network ("SDN") switch for example) processes packets in accordance with wildcard rules, and a controller controls which bucket rules and wildcard rules are stored on switch cache memory. A first example embodiment 410 provides one controller 412 for controlling which bucket rules and wildcard rules are stored on switch cache memory for each of multiple switches 414. A second example embodiment 420 provides multiple controllers 422 for controlling which bucket rules and wildcard rules are stored on switch cache memory for each of multiple switches 424. A third example embodiment 430 provides multiple controllers 432 for controlling which bucket rules and wildcard rules are stored on switch cache memory for a switch 434. Finally, a fourth example embodiment 440 provides a switch 444 including its own controller 442 for controlling which bucket rules and wildcard rules are stored on switch cache memory of the switch.

§ 4.3 Example Wildcard Rule Caching Method(s)

Figure 5:
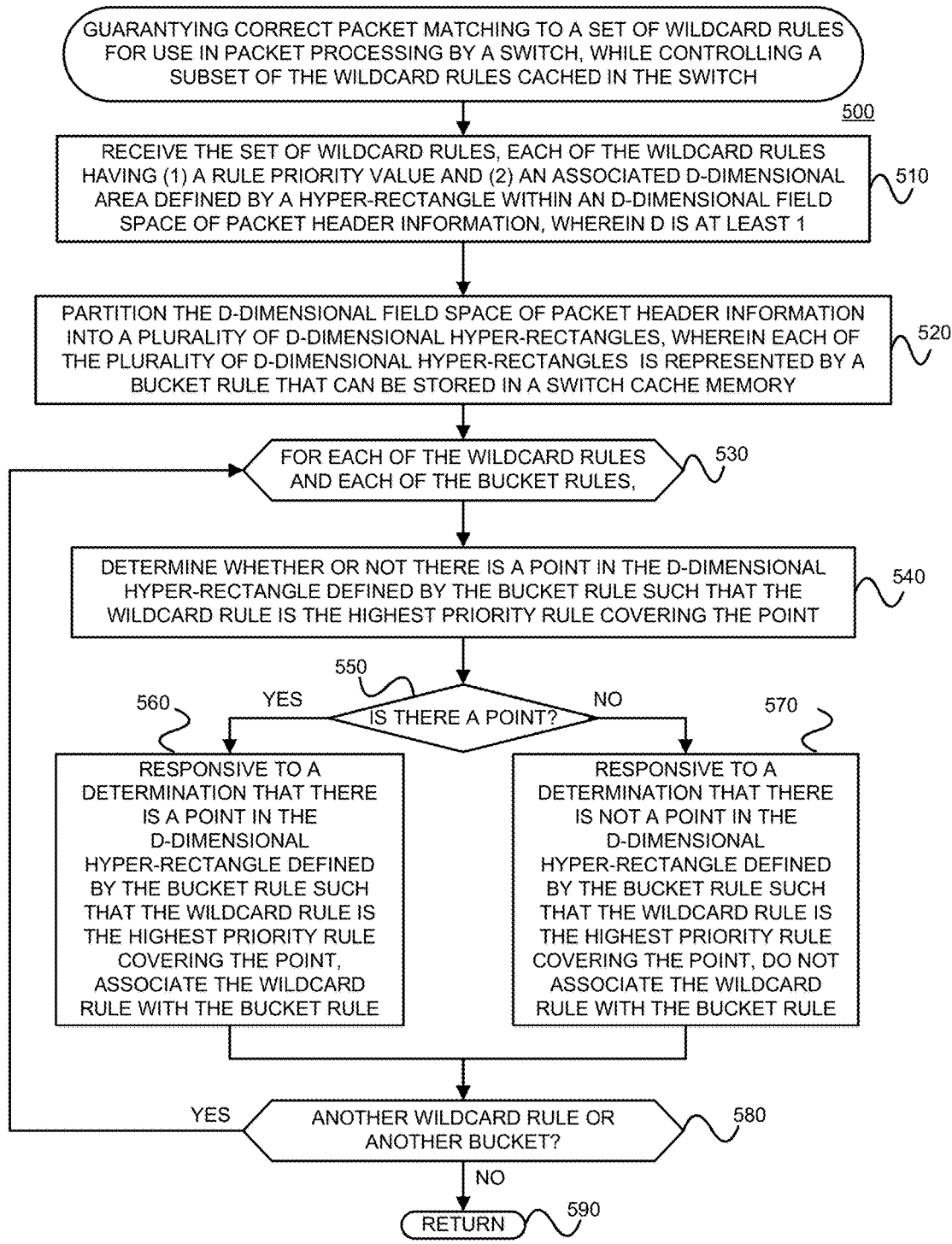
FIG. 5 is a flow diagram of an example method for guarantying correct packet matching to a set of wildcard rules for use in packet processing by a switch, while controlling a subset of the wildcard rules cached in the switch, in a manner consistent with the present invention.

FIG. 5 is a flow diagram of an example method 500 for guarantying correct packet matching to a set of wildcard rules for use in packet processing by a switch, while controlling a subset of the wildcard rules cached in the switch. The set of wildcard rules is received as an input. (Block 510) Each of the wildcard rules has (1) a rule priority value and (2) an associated D-dimensional (where D is at least 1) area defined by a hyper-rectangle within a D-dimensional field space of packet header information. (Note that a hyper-rectangle is not strictly a rectangle. For example, for D=1, a hyper-rectangle is a line; for D=2, a hyper-rectangle is a rectangle having an area; for D=3, a hyper-rectangle is a rectangular prism or cube having a volume; for D=4, a hyper-rectangle is a 4D hyper-rectangle; etc.). The D-dimensional field space of packet header information is partitioned into a plurality of D-dimensional hyper-rectangles, wherein each of the plurality of D-dimensional hyper-rectangles is represented by a bucket rule that can be stored in a switch cache memory. (Block 520) (Details of an example partitioning method consistent with the present invention are described later with reference to FIG. 6.) A number of steps are performed for each of the wildcard rules and for each of the bucket rules. (Loop 530-580) More specifically, for each of the wildcard rules and each of the bucket rules, it is determined whether or not there is a point in the D-dimensional hyper-rectangle defined by the bucket rule such that the wildcard rule is the highest priority rule covering the point. (Block 540) Responsive to a determination that there is a point in the D-dimensional hyper-rectangle defined by the bucket rule such that the wildcard rule is the highest priority rule covering the point, the wildcard rule is associated with the bucket rule (Decision 550 YES, and Block 560), and otherwise, responsive to a determination that there is not a point in the D-dimensional hyper-rectangle defined by the bucket rule such that the wildcard rule is the highest priority rule covering the point, not associating the wildcard rule with the bucket rule (Decision 550 NO and Block 570). Once all of the wildcard rules and buckets have been processed (Loop 530-580, NO), the method 500 is left. (Node 590)

Referring back to block 520, example embodiments consistent with the present invention may use various techniques for partitioning the D-dimensional field space of packet header information into D-dimensional hyper-rectangles (or buckets). Some example techniques for partitioning the D-dimensional field space into buckets are described in § 4.3.1 below.

§ 4.3.1 Example Method(s) for Partitioning the D-Dimensional Field Space into Buckets § 4.3.1.1 Bucket Generation Overview Bucket generation may be handled by a software based controller. How to best generate buckets can be thought of in terms of the following problem: given a policy rule set R, partition the D-dimensional field space F into a bucket set B. An optimal set of buckets generated shall get the lowest cache miss rate for a given switch cache memory (e.g., TCAM) size when the switch (e.g., an OpenFlow switch) caches the buckets and their associated rules responsive to arriving packets.

Note that the size of buckets directly affects the cache performance. The "size" of a bucket is defined as the number of rules associated with it. A larger bucket can potentially reduce bucket (e.g., flow setup) requests, since more packets (or flows) arriving at the switch tend to share the same bucket and, in aggregate, generate fewer requests. However, a larger bucket can also (1) waste space in the switch's cache memory (e.g., TCAM) (because it increases that likelihood that some wildcard rules will be installed but not matched by any packets) and (2) increase the chance of switch cache memory (e.g., flow table) overflow. Furthermore, since a larger bucket will trigger the installation of more wildcard rules each time it is requested, this causes more control bandwidth to be used. On the other hand, a small bucket may advantageously reduce the unused wildcard rules cached in the switch's cache memory. However, for smaller buckets, the switch will tend to cache more buckets in a bucket filter (described below), and this also consumes space in the switch's cache memory.

In some example embodiments consistent with the present invention, the size of each bucket is bound with a fixed value N. The optimal choice of N depends on both the (1) distribution of wildcard rules and (2) traffic pattern. The bound on the bucket size N can be determined using a given set of rules and historical traces of traffic. The effect of different bucket size bounds N is discussed in detail in § 4.6.2.3 below.

§ 4.3.1.2 Example Bucket Generation Procedure

Bucket generation requires the field space to be partitioned. Therefore, an example bucket generation procedure may share some similarities with earlier packet classification work such as HiCuts and HyperCuts (See, e.g., the article, Singh, F. Baboescu, G. Varghese, and J. Wang, "Packet Classification Using Multidimensional Cutting," *Proceedings of the* 2003 *conference on Applications, Technologies, Architectures, and Protocols for Computer Communications*, p. 213-224 (ACM, incorporated herein by reference.) used for generating decision trees for field space partitioning. In bucket generation, the fact that buckets are represented by wildcard rules (referred to as "bucket rules" or simply "buckets") so as to be stored in TCAM is considered. Consequently, binary or multi-binary cuts are taken on each dimension of the field space.

Figure 6:
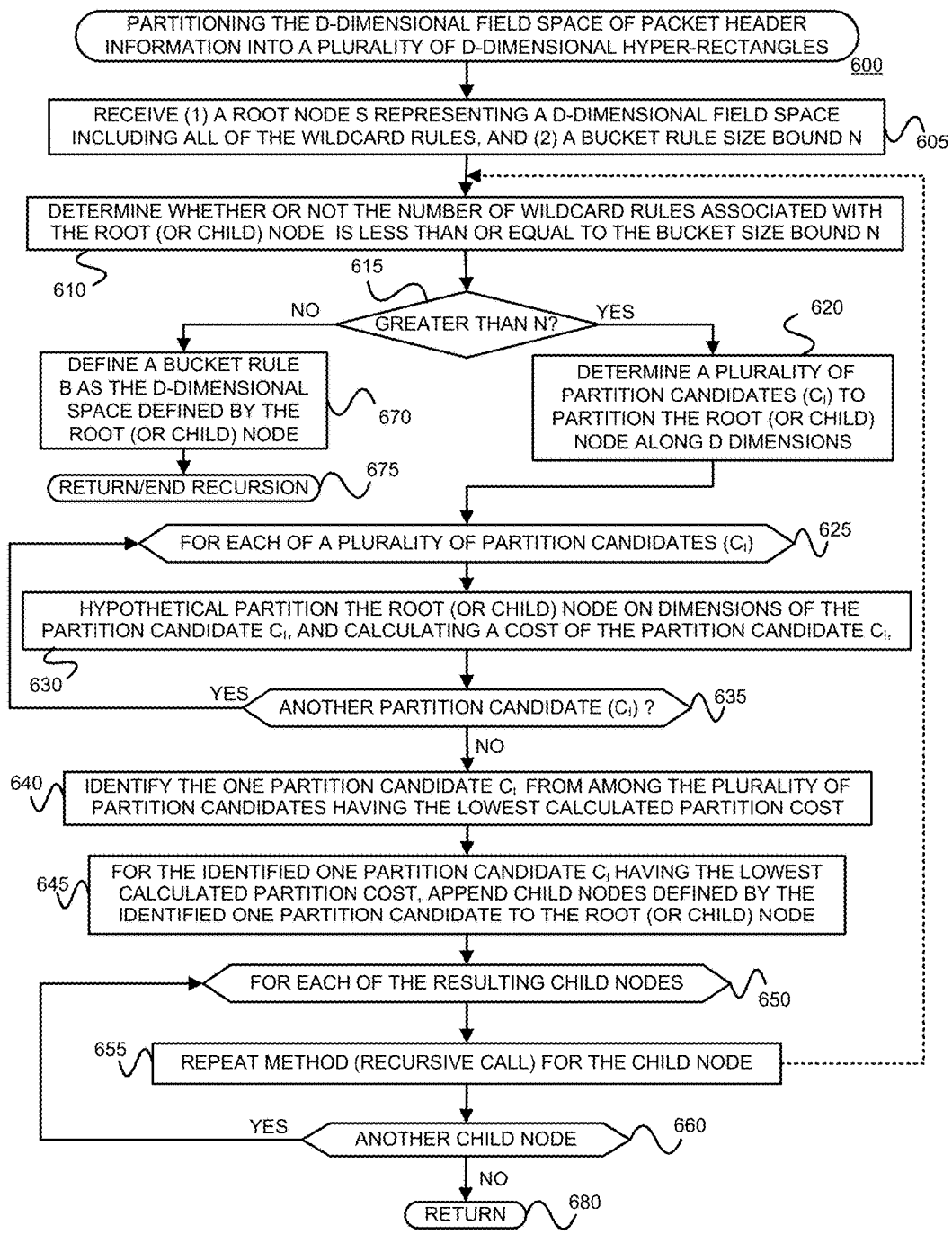
FIG. 6 is a flow diagram of an example method for partitioning, in a manner consistent with the present invention, a D-dimensional field space of packet header information into a plurality of D-dimensional hyper-rectangles, wherein each of the plurality of D-dimensional hyper-rectangles is represented by a bucket rule that can be stored in a switch cache memory.

FIG. 6 is a flow diagram of an example method 600 for partitioning the D-dimensional field space of packet header information into a plurality of D-dimensional hyper-rectangles, wherein each of the plurality of D-dimensional hyper-rectangles is represented by a bucket rule that can be stored in a switch cache memory (e.g., TCAM). A root node S representing a D-dimensional field space including all of the wildcard rules and a bucket rule size bound N are received as inputs. (Block 605) Then, whether or not the number of wildcard rules associated with the root node (or a child node, processed in a recursion of the method 600) is less than or equal to the bucket size bound N is determined. (Block 610) Responsive to a determination that the number of wildcard rules associated with the root node (or a child node being processed) is less than or equal to the bucket size bound N (Condition 615, NO), a bucket rule B is defined as the D-dimensional space defined by the root node (or a child node being processed) (Block 670), and the method 600 is left or a recursion of the method is ended (Node 675). (Note that if a recursion of the method is ended, the processing continues at 660.) Otherwise, responsive to a determination that the number of wildcard rules associated with the root node (or child node being processed) is greater than the bucket size bound N (Condition 615, YES), a plurality of partition candidates (each of the candidates denoted by $c_i$) to partition the node along D (where D is a whole number of at least one) dimensions are then determined. (Block 620) For each of a plurality of partition candidates ($c_i$) (Loop 625-635), the root node S (or the child node being processed) is hypothetically partitioned (for evaluation as a candidate partition) on dimensions of the partition candidate $c_i$, and a cost of the partition candidate $c_i$ is calculated (Block 630). Then, one partition candidate $c_i$ from among the plurality of partition candidates having the lowest calculated partition cost is determined. (Block 640) For the identified one partition candidate $c_i$ having the lowest calculated partition cost, child nodes ($S_0^{c_i} \ldots S_{2^m-1}^{c_i}$), where m is the number of dimensions chosen for the partition, defined by the identified one partition candidate are appended to the root node S (or to the child node being processed). (Block 645) Then, for each of the resulting child nodes $S_k^{c_i}$ (Loop 650-660), the method 600 is called recursively for the child node (instead of the root node S). (Block 655 and dotted line back to block 610) Once all recursions for all child nodes are run (Loop 650-660, NO), the method 600 is left (Node 680).

Referring back to block 605, the root node of a tree represents the D-dimensional field space F associated with the whole rule set $\mathfrak{R}$. Starting from the root node, the node from the tree is partitioned recursively into child nodes with smaller size (defined as the number of associated rules of the node). (Recall blocks 620 and 630.) Each node therefore represents a hyper-rectangle in the field space. The partitioning continues until the size of the resulting child node is less than or equal to the predetermined N. (Recall NO branch of condition 615.) When this occurs, the leaf node is marked as a bucket. (Recall block 670.)

Each time, m out of D dimensions are selected to partition a node. For example, suppose a candidate m-combination to partition a node S is denoted as $c_i$ (i indexed from 0 to $$\binom{d}{m} - 1.$$

This will generate $2^m$ child nodes, denoted $S_k^{c_i}$. For instance, if m=1 dimension is partitioned each time on a D=2 dimensional field, and $2^1$ child nodes are generated for each partition.

To determine the $c_i$ to partition on, the example procedure may consider both the sum and the deviation of the sizes of nodes generated by a trial cut on $c_i$. The $c_i$ that minimizes a cost function defined as follows:

$$Cost_{c_i}(S) = \sum_{k=0}^{2^m-1} A(S_k^{c_i}) + \delta \sum_{k=0}^{2^m-1} \left( A(S_k^{c_i}) - \sum_{k=0}^{2^m-1} A(S_k^{c_i})/2m \right)$$

where $A(S_k^{c_i})$ stands for the number of associated rules or the size of hyper-rectangle $S_k^{c_i}$, and $\delta$ is a positive value to adjust the weight between the sum and the deviation, is chosen. By minimizing the cost of the node, the redundancy of having the same wildcard rules associated with different buckets can be minimized. By balancing the size of the nodes generated, having some nodes having a relatively large size (which increase the depth of the tree) can be avoided.

In an example bucket generation procedure, for each iteration, m=2 dimensions over the 5-tuple field space, are cut. Doing so provides a good tradeoff between the decision tree search time and storage overhead. For example, suppose the partition was done on one dimension each time. In such a case, the resulting tree will become very deep and prolong the decision tree search time. By contrast, if a larger dimension m (for example, m=5) is used, each partition will generate $2^m$ (e.g., $2^5=32$) children. In such a case, a large memory overhead with many wildcard rules duplicated in different buckets will result. The parameter $\delta$ of the cost function may be tuned to minimize the number of buckets.

Pseudo-code of an example procedure for outputting a bucket set B given a rule set $\mathfrak{R}$, a Node S (e.g., starting with the root node), and a bucket size bound N, consistent with the method 600 of FIG. 6, is as follows:

| Algorithm 1 Bucket Generation Algorithm |
| --- |
| Input: Rule set $\mathfrak{R}$, Node S, Size bound N |
| Output: Decision tree T, Bucket Set B |
| 1:   function Partition($\mathfrak{R}$; S;N) |
| 2:       for each $c_i$ made from d dimensions do |
| 3:           Partition on dimensions of $c_i$, and calculate the cost $Cost_{c_i}$ (S) |
| 4:       end for |
| 5:       Find ci where the $Cost_{c_i}$ (S) is minimized, and append $S_0^{ci}$ ... $S_{2^m-1}^{ci}$ to T |
| 6:       for each child hyper-rectangle $S_k^{ci}$ do |
| 7:           if the number of associate rules, or "size" $A(S_k^{ci}) \le N$ then |
| 8:               Append $S_k^{ci}$ to B |
| 9:               return |
| 10:          else Partition($\mathfrak{R}$; $S_k^{ci}$ ;N) |
| 11:          end if |
| 12:      end for |
| 13:  end function |

§ 4.3.2 Example Illustrating Bucket Generation Procedure

FIGS. 7(a)-7(c) provide a simple example illustrating the construction of a decision tree 700 used to generate buckets in a manner consistent with the method 600 of FIG. 6. Referring to FIG. 7(a), the root node 710, which represents the D-dimensional field space F 720 associated with the whole rule set $\mathfrak{R}$, and a bucket size bound N=2, were provided as input. (Recall 605 of FIG. 6.) In this example, there are four (4) 2-dimensional wildcard rules (R1-R4) in the 2-dimensional field space 720. Wildcard rules R1 and R2 have a higher priority than wildcard rule R3, which has a high priority than wildcard rule R4. In this example, it is assumed that a partition along F1 has a lower cost than a partition along F2.

Referring to FIG. 7(b), the root node 710 is partitioned along F1 and child nodes 730 and 740 result. Since child node 730 only has two (2) wildcard rules (R1 and R3), which is not greater than the bucket rule size bound of two (2), the child node 730 is a bucket. (Recall 610, 615 and 670 of FIG. 6.) However, the child node 740 has three (3) wildcard rules (R2, R3, R4), which is greater than the bucket size bound of two (2). Therefore, referring to FIG. 7(c), the child node 740 is further partitioned, recursively, into child nodes 742 and 744. (Recall, 610 and 615 of FIG. 6.) In this example, it is assumed that a further partition along F2 has a lower cost than a further partition along F1. Since each of the child nodes 742 and 744 have two (2) wildcard rules, which is not greater than the bucket size bound N=2, they are defined as buckets. (Recall, 610, 615 and 670 of FIG. 6.)

In the foregoing example, m=1 dimension is partitioned each time on a D=2 dimensional field 720, and $2^1$ child nodes are generated for each partition.

§ 4.3.3 Example Method(s) for Packet Processing with Wildcard Rule Cache Control FIG. 8 is an example method 800 for packet processing (with wildcard rule cache control) in a manner consistent with the present invention. It is assumed that bucket rules have been defined and wildcard rules have been associated with appropriate ones of the bucket rules. This may have been done using the example methods 500 and 600 discussed above with reference to FIGS. 5 and 6, respectively. The example method 800 starts when a packet is received. (Block 805) Header information is extracted from the received packet (Block 810) and a location of the extracted header information in the D-dimensional field space is determined (Block 815). Whether or not any D-dimensional hyper-rectangle represented by any currently cached bucket rule includes the determined location of the extracted header information is then determined. (Block 820) Responsive to a determination that there is no D-dimensional hyper-rectangle represented by any currently cached bucket rule that includes the determined location of the extracted header information (that is, responsive to a cache "miss") (Condition 825, NO), a bucket rule representing the D-dimensional hyper-rectangle that includes the determined location is identified (Block 830), the identified bucket rule is cached (e.g., stored in the switch's cache memory) (Block 835), any wildcard rules associated with the identified bucket rule are also cached (Block 840), a highest priority one of the cached wildcard rules that includes the determined location of the extracted header information (and is therefore inherently associated with the determined bucket rule) is identified (Block 845), and the identified highest priority one of the wildcard rules is applied to the received packet to process the packet (Block 850). In some example embodiments, a hard timer value is associated with both the cached bucket rule and the cached wildcard rules associated with the identified bucket rule. (Block 855) In some example embodiments, an idle timer value is associated with the cached bucket rule. These timers are discussed later. Referring back to condition 825, responsive to a determination that any D-dimensional hyper-rectangle represented by any currently cached bucket rule includes the determined location of the extracted header information (that is, responsive to a cache "hit")(Condition 825, YES), a highest priority one of the cached wildcard rules that includes the determined location of the extracted header information (and is therefore inherently associated with the determined bucket rule) is identified (Block 860), and the identified highest priority one of the wildcard rules is applied to the received packet to process the packet (Block 865). In some example embodiments, the idle timer value associated with the "HIT" currently cached bucket rule is reset on a cache hit. (Block 870)

As should be appreciated from the foregoing, header information from a received packet is used to determine whether or not a corresponding bucket rule (and its associated wildcard rules) is already cached. If not (cache "miss"), the bucket rule and its associated wildcard rules are cached, and the highest priority one of the wildcard rules that includes the location of the extracted header information is applied to the received packet to process the received packet. If a corresponding bucket rule (and its associated wildcard rules) is already cached (cache "hit"), the highest priority one of the wildcard rules that includes the location of the extracted header information is applied to the received packet to process the received packet.

In some example embodiments, a hard timer is used to delete cached buckets and/or rules from the switch's cache memory after the expiration of a certain time. This ensures that a wildcard rule that has been changed or deleted does not persist too long in the switch's cache memory.

In some example embodiments, a cached bucket rule is associated with an idle timer, which is to be restarted responsive to a cache hit, is used to delete cached bucket rules from the switch's cache memory if the bucket rule has not been requested (hit) for a certain period of time. In this way, frequently used bucket rules can be maintained in the switch's cache memory, while less frequently used bucket rules can be removed. However, if the hard timer expires, the bucket rule will be removed from the switch's cache memory regardless of whether or not the idle timer still has time. Various combinations of hard and idle timers are possible, provided that a wildcard rule is not deleted without deleting any cached bucket rule(s) associated with the wildcard rule.

In some example embodiments consistent with the present invention, if the D-dimensional area defined by a hyper-rectangle within an D-dimensional field space of packet header information of a wildcard rule is greater than a predetermined size, that wildcard rule may be pre-cached in the switch's cache memory because there is a high probability that such a wildcard rule will be used and/or a bucket including such a wildcard rule will be used. Such a pre-cached wildcard rule may be provided with a very high hard time value so they persist in cache as a "static" wildcard rule. If it is desired to change or delete such a "static" wildcard rule, the controller may invoke such a change or deletion.

§ 4.4 Example Wildcard Rule Caching Apparatus

FIG. 9 is a block diagram of an example system 900 for implementing example methods consistent with the present invention. The system includes a controller 910 and a switch 920. (Although a single controller 910 and a separate single switch 920 are illustrated, recall from FIG. 4 that other configurations are possible.) The controller 910 includes a storage device 912 storing bucket rules and associated wildcard rules and a storage device 914 storing wildcard rules, as well as a rule update (e.g., insert, delete, revise) module 913, a bucket generation module 911 and a bucket request serving module 915. The rule update module 913 may be used to manage the wildcard rules stored in storage device 914. For example, the rule update module 913 may insert new wildcard rules, delete expired wildcard rules, or revise existing wildcard rules. The bucket generation module 911 may implement the example method 500 of FIG. 5 (and perhaps the example method 600 of FIG. 6), or some other methods for generating bucket rules from the wildcard rules 914, and associating appropriate ones of the wildcard rules. Recall that the bucket rules and associated wildcard rules are stored in storage device 912.

The switch 920 includes a cache memory (portion) 930 implementing a bucket filter and a cache memory (portion) 940 implementing a packet processing table (e.g., a flow table), as well as a packet-to-cached bucket/cached wildcard rule matching module 950, a bucket request module 960 and a bucket rule and wildcard rule installation (and deletion) module 970. The bucket filter 930 includes a number of entries, each entry including a bucket rule 932 and a (hard and/or idle) timeout value 934. The packet processing table 940 includes a number of entries, each entry including a wildcard rule 942 and a hard timeout value 944. The bucket filter 930 and the packet processing table 940 define a two-stage match pipeline. The packet-to-cached bucket/cached wildcard rule matching module 950 may implement, for example, steps 805-825, 845, 860, 865 and 870 of the example method 800 of FIG. 8. The bucket request module 960, together with the bucket request serving module 915, may implement, for example, step 830 of the example method 800 of FIG. 8. Finally, the bucket rule and wildcard rule installation module 970 may implement, for example, steps 835, 840 and 855 of the example method 800 of FIG. 8.

In the example system 900, all the bucket rules cached in the bucket filter 932 have the same priority with the same action that directs a matching packet to the next stage packet processing table 940. The wildcard rules are cached in the packet processing table 940 according to their original priority.

The switch implementation 920 of the example system 900 is fully compatible with the packet processing table pipeline specified in the OpenFlow switch specification 1.4. (See, e.g., Open flow switch specification 1.4.0, available at https://www.opennetworking.org/ Oct. 2013, incorporated herein by reference.) Although the bucket filter 930 and the packet processing table 940 are two tables logically, they can be implemented by two separate TCAM chips, or in one TCAM chip with multiple lookups. Thus, the bucket filter 930 and the packet processing table 940 may be implemented in the same cache memory, or in different cache memories.

Example embodiments consistent with the present invention might be implemented in hardware, such as one or more field programmable gate arrays ("FPGAs"), one or more integrated circuits such as an application specific integrated circuit ("ASICs"), one or more network processors, etc. Alternatively, or in addition, embodiments consistent with the present invention might be implemented as stored program instructions executed by a processor.

FIG. 10 is a block diagram of an exemplary machine 1000 that may be used to implement various modules, perform various operations, and store various information generated and/or used by such modules and operations, in a manner consistent with the present invention. The exemplary machine 1000 includes one or more processors 1005, one or more input/output interface units 1015, one or more storage devices 1010, and one or more system buses and/or networks 1030 for facilitating the communication of information among the coupled elements. One or more input devices 1020 and one or more output devices 1025 may be coupled with the one or more input/output interfaces 1015. The one or more processors 1005 may execute machine-executable instructions (e.g., C or C++ running on the Linux operating system widely available from a number of vendors such as Red Hat, Inc. of Durham, N.C.) to effect one or more aspects of the present invention. At least a portion of the machine executable instructions may be stored (temporarily or more permanently) on the one or more storage devices 1010 and/or may be received from an external source via one or more input interface units 1015.

In some embodiments consistent with the present invention, the processors 1005 may be one or more microprocessors. The bus 1030 may include a system bus. The storage devices 1010 may include system memory, such as read only memory ("ROM") and/or random access memory ("RAM"). The storage devices 1010 may also include a hard disk drive for reading from and writing to a hard disk, a magnetic disk drive for reading from or writing to a (e.g., removable) magnetic disk, and an optical disk drive for reading from or writing to a removable (magneto-) optical disk such as a compact disk or other (magneto-) optical media.

Some embodiments consistent with the present invention may also be provided as a machine-readable medium for storing the machine-executable instructions. The machine-readable medium may be non-transitory and may include, but is not limited to, flash memory, optical disks, CD-ROMs, DVD ROMs, RAMs, EPROMs, EEPROMs, magnetic or optical cards or any other type of machine-readable media suitable for storing electronic instructions. For example, the instructions and/or parameter values for implementing one or more aspects of the present invention may be downloaded as a computer program which may be transferred from a remote computer (e.g., a server) to a requesting computer (e.g., a client) by way of a communication link (e.g., a modem or network connection) and stored on a non-transitory storage medium. The machine-readable medium may also be referred to as a processor-readable medium.

§ 4.5 Example of Operation of Example Method(s) for Packet Processing with Wildcard Rule Cache Control An example of operations of example methods for packet processing with wildcard rule cache control is now described with reference to FIGS. 11(a)-11(c), as well as FIGS. 3(b) and 8. Generally, if the packet-to-cached bucket/wildcard rule match module 950 receives a packet having a header information location that does not belong to a matching bucket rule in the bucket filter 930 (MISS), the bucket request module 960 encapsulates the packet's header (or relevant information extracted from the packet's header), and forwards the encapsulated header information to the controller 910 in a request. When the bucket request serving module 915 of the controller 910 receives a request, it will (1) perform a search of storage device 912 to obtain the relevant bucket rule and any associated wildcard rules and (2) send a reply to the switch 920. When the switch 920 receives the reply, the bucket rule and wildcard rule installation module 970 may then install the bucket rule (in the bucket filter 930) and all its associated wildcard rules (in the packet processing table 940), and the packet may be processed using the highest priority matching wildcard rule.

In the example system 900, the bucket rule is the unit used in the installation and removal of cached entries. Note that multiple buckets can share the same wildcard rules. When deleting a wildcard rule, all the bucket rules that are associated with the deleted wildcard rule are to be deleted as well. To guarantee that this coherency will occur, the same hard timeout value $T_H$ is assigned to the bucket rule and all its associated wildcard rules. If a wildcard rule is found to have been cached earlier along with another bucket rule, the hard timeout value of the wildcard rule is refreshed according to the most recent installation.

Consider, for example, the flow arrivals shown in FIG. 3(b). Assume that both the bucket filter 930 and the packet processing table 940 are empty initially. Referring to FIG. 11(a), at time $t_1$, a packet with header information location f1 arrives at the switch 920. Since the packet-to-cached bucket rule/wildcard rule match module 950 finds no matching bucket rule in the bucket filter 930, this MISS is communicated to the bucket request module 960. The bucket request module 960 of the switch 910 sends a bucket request to the controller 910. At the controller 910, the bucket request serving module 915 searches for the appropriate bucket rule and its associated wildcard rules, and sends a reply with bucket rule F and its associated wildcard rules R3 and R4. Responsive to receiving the reply, the bucket rule and wildcard rule installation module 970 of the switch 920 installs the bucket rule F in the bucket filter 930 and its associated wildcard rules R3 and R4 in the packet processing table 940. The hard timeout for each is set as $t_1+T_H$. Finally, since only rule R4 includes f1, rule R4 is applied to the packet.

Referring to FIGS. 3(b) and 11(b), later, at time $t_2$, packet f2 arrives at the switch. The packet-to-cached bucket rule/wildcard rule match module 950 determines that f2 matches bucket F stored in the bucket filter 930 (a HIT). The packet-to-cached bucket rule/wildcard rule match module 950 then determines that packet f2 matches wildcard rules R3 and R4 in the packet processing table 940. Referring to FIG. 3(b), since wildcard rule R3 has a higher priority than R4, R3 is applied to the packet f2. (Although not shown here, if the cached bucket rules are provided with idle timers as well, such idle timers should be restarted for each time the cached bucket rule is HIT.)

Referring to FIGS. 3(b) and 11(c), later, at time $t_3$, another packet f3 arrives at the switch 920. Since the packet-to-cached bucket rule/wildcard rule match module 950 finds no matching bucket rule in the bucket filter 930, this MISS is communicated to the bucket request module 960. The bucket request module 960 of the switch 920 sends a bucket request to the controller 910. At the controller 910, the bucket request serving module 915 searches for the appropriate bucket rule and its associated wildcard rules, and sends a reply with bucket rule C and its associated wildcard rules R2 and R3. Responsive to receiving the reply, the bucket rule and wildcard rule installation module 970 of the switch 920 installs the bucket rule C in the bucket filter 930 and its associated wildcard rules R2 and R3 in the packet processing table 940. The hard timeout for each is set as $t_3+T_H$. Notice that since wildcard rule R3 was already in packet processing table 940 of the switch 920, its timeout is refreshed to $t_3+T_H$. Finally, referring back to FIG. 3(b), although both wildcard rules R2 and R3 include f3, wildcard rule R2 is applied to the packet f3 since the priority of R2 is higher than that of R3.

§ 4.6 Performance Evaluation

§ 4.6.1 Simulation Setup

§ 4.6.1.1 Rules and Traces Generation

To generate rules and traces, since the present inventors could not obtain a real rule set with enough scale for the simulation, a synthetic rule set with 4k rules was generated using ClassBench (See the article, D. E. Taylor and J. S. Turner, "Classbench: A Packet Classification Benchmark," *INFOCOM* 2005 24*th Annual Joint Conference of the IEEE Computer and Communications Societies. Proceedings IEEE*, Vol. 3, pp. 2068 2079 (IEEE, 2005), incorporated herein by reference.) for the testing performance evaluation. (Although the inventors did have real traces from NYCDoE-DC, directly using it with synthetic rules is infeasible.) Most traffic hits the default rules due to inconsistency between traces and rules. To bridge the gap, the present inventors developed a header mapping technique that mapped the real traces on to synthetic rules. (Source code available at https://github.com/bovenyan.) In this way, the statistics of flows (packet size, inter-arrival rate, and flow duration) are preserved. Trace pruning and interpolation are designed for tuning traffic load. A snapshot of the synthetic trace generated is shown in FIG. 12 with a duration of 5 minutes. Note the close resemblance of the layout of synthetic traces in FIG. 12 to the real ones in FIG. 1.

§ 4.6.1.2 Device Parameters

In the tests, the present inventors simulated a single OpenFlow switch with direct connection to the controller. The TCAM capacity was set to support 1500 entries, each costing 288 bits memory. For simplicity, the round trip time ("RTT") for the flow setup upon a cache miss was set fixed to be 2 ms while the forwarding delay at a line rate is 5 ns (See, e.g., the article, A. R. Curtis, J. C. Mogul, J. Tourrilhes, P. Yalagandula, P. Sharma, and S. Banerjee. Devoow, "Scaling Flow Management for High-Performance Networks," *ACM SIGCOMM Computer Communication Review*, Vol. 41, pp. 254-265 (ACM, 2011), incorporated herein by reference.). Queuing delays of rule installation were not covered in the simulation.

§ 4.6.1.3 Schemes for Testing

The present inventors evaluated the following three rule caching schemes along with a scheme consistent with the present invention (referred to as "CAB") to compare performance. All the schemes guarantee the semantic correctness of packet matching.

Caching exact-match rules ("CEM") is proposed in Ethane (See, e.g., the article, M. Casado, M. J. Freedman, J. Pettit, J. Luo, N. Gude, N. McKeown, and S. Shenker, "Rethinking Enterprise Network Control," *IEEE/ACM Transactions on Networking (TON)*, Vol. 17, No. 4, pp. 1270 1283 (2009), incorporated herein by reference.) and Devo-Flow (See, e.g., the article, A. R. Curtis, J. C. Mogul, J.

Tourrilhes, P. Yalagandula, P. Sharma, and S. Banerjee. Devoow, "Scaling Flow Management for High-Performance Networks," *ACM SIGCOMM Computer Communication Review*, Vol. 41, pp. 254-265 (ACM, 2011), incorporated herein by reference.) to control all or partial flows in the network. CEM suggests caching the exact-match rules of a flow when corresponding entry is absent in the flow table. In the simulation, the present inventors considered exact-match rules to be supported by SRAMs with 200k-entry capacity.

2. Caching micro-rules ("CMR") is a scheme proposed by Q. Dong et al. (See, e.g., the article, Q. Dong, S. Banerjee, J. Wang, and D. Agrawal, "Wire Speed Packet Classification Without TCAMs: A Few More Registers (and a Bit Of Logic) are Enough," *ACM SIGMETRICS Performance Evaluation Review*, Vol. 35, pp. 253 264 (ACM, 2007), incorporated herein by reference.) and applied in DIFANE (See, e.g., the article, M. Yu, J. Rexford, M. J. Freedman, and J. Wang, "Scalable Flow-Based Networking with Difane," *ACM SIGCOMM Computer Communication Review*, Vol. 41, No. 4, pp. 351 362 (2011), incorporated herein by reference.). CMR partitions the rule set into new micro-rules without overlapping and caches them in the switches.

3. Caching dependent rules ("CDR") works as a naive benchmark. When a flow request is received, CDR installs the requested rule and all its dependent rules to the flow table.

§ 4.6.2 Simulation Results

§ 4.6.2.1 Resource Consumption

The present inventors measured the cache miss rate and the control bandwidth consumption of the four different rule caching schemes (i.e., CAB, CEM, CMR and CDR) with varying flow arrival rates. The simulation tested on traces with a duration of 20 minutes. The results are shown in FIG. 13. Since flows rarely share exactly the same 5-tuple address, each flow arrival contributes to a cache miss in CEM. CDR requires all the dependent rules to be installed; therefore, it quickly overflows the memory. CMR benefits from caching micro range rules and performs better than the prior two. However, as too many micro rules are generated and cached, it also overwhelms the memory shortly after. By contrast, CAB generates more than one tenth cache misses of CMR, and the bandwidth consumption is more than a half less. Although eventually it overflows the table (not shown in the graph), it can stably support an arrival rate of 15000 flows/sec.

§ 4.6.2.2 Flow Setup Time

The average flow setup times of the four schemes, given the arrival rate of 1000 flows/sec, are as follows: CAB 37.9 µs; CMR 66.0 µs; CDR 553.4 µs; and CEM 1965.3 µs. Results under higher arrival rates are not presented because CDR and CMR experience flow table overflow, rendering unpredictably long setup times due to request queuing and control bandwidth congestion. As expected, CAB achieves the lowest flow setup latency. CMR also enjoys nice performance since micro rules are frequently reused by localized traffic. CDR is inferior to the prior two as caching all dependent rules increases cache misses. For CEM, since almost each flow needs to be forwarded to the controller, the average setup time is close to the RTT of a flow setup. Considering the results denote the average delay on each flow per switch, the difference on even the micro second scale means a lot.

§ 4.6.2.3 Effects of Tuning Bucket Size

FIG. 14 presents the effect of tuning the bound of bucket size N on cache miss and rules installed per second. Traces with an arrival rate of 7000 flows/sec were tested. For a smaller bucket size, cache miss is high because more buckets need to be installed. Increasing the bucket size reduces the cache miss within a range, as each bucket is reused by more flows. Meanwhile, the number of rules installed per second increases because a larger bucket has more associated rules. Beyond a certain bound, the flow table is overflowed and cache miss increases significantly. A proper selection of N for this case range from 9 to 16. The tuning of bucket size shows the potential of dynamic bucket generation, where the size of bucket differs from one to another and changes over time.

§ 4.7 Conclusions

As should be appreciated from the foregoing, example embodiments consistent with the present invention resolve rule dependency while using control network bandwidth efficiently. Further, controller processing load and flow setup latency are reduced.

What is claimed is:

1. A computer-implemented method for guarantying correct packet matching to a set of wildcard rules for use in packet processing by a switch, while controlling a subset of the wildcard rules cached in the switch, the method comprising:
   a) receiving, with a computer system including at least one processor, the set of wildcard rules, each of the wildcard rules having (1) a rule priority value and (2) an associated D-dimensional area defined by a hyper-rectangle within a D-dimensional field space of packet header information, wherein D is at least 1;
   b) partitioning, with the computer system, the D-dimensional field space of packet header information into a plurality of D-dimensional hyper-rectangles, wherein each of the plurality of D-dimensional hyper-rectangles is assigned to a single, unique bucket rule that can be stored in a switch cache memory, wherein there is a one-to-one assignment relationship between each of the plurality of D-dimensional hyper-rectangles and each of the bucket rules;
   c) for each of the wildcard rules received and each of the bucket rules previously assigned to a corresponding unique one of the previously defined D-dimensional hyper-rectangles, determining, with the computer system, whether or not there is a point in the D-dimensional hyper-rectangle defined by the bucket rule such that the wildcard rule is the highest priority rule covering the point; and
   d) responsive to a determination that there is a point in the D-dimensional hyper-rectangle defined by the bucket rule such that the wildcard rule is the highest priority rule covering the point, associating, with the computer system, the wildcard rule with the bucket rule, and otherwise, responsive to a determination that there is not a point in the D-dimensional hyper-rectangle defined by the bucket rule such that the wildcard rule is the highest priority rule covering the point, not associating the wildcard rule with the bucket rule.

2. The computer-implemented method of claim 1, wherein the computer system includes a first part and a second part, wherein the first part has more memory than the second part, but the second part can process packets faster than the first part, the computer-implemented method further comprising:
   e) receiving, with the second part of the computer system, a packet;
   f) extracting, with the second part of the computer system, header information from the received packet;

g) determining, with the second part of the computer system, a location of the extracted header information in the D-dimensional field space;

h) determining, with the second part of the computer system, whether or not any D-dimensional hyper-rectangle represented by any currently cached bucket rule includes the determined location of the extracted header information; and i) responsive to a determination that there is no D-dimensional hyper-rectangle represented by any currently cached bucket rule that includes the determined location of the extracted header information,
   (1) identifying, with the first part of the computer system, a bucket rule representing the D-dimensional hyper-rectangle that includes the determined location,
   (2) caching, with the second part of the computer system, the identified bucket rule,
   (3) caching, with the second part of the computer system, any wildcard rules associated with the identified bucket rule,
   (4) identifying, with the computer system, a highest priority one of the cached wildcard rules, associated with the determined bucket rule, that includes the determined location of the extracted header information, and
   (5) applying, with the computer system, the identified highest priority one of the wildcard rules to the received packet to process the packet, and otherwise, responsive to a determination that any D-dimensional hyper-rectangle represented by any currently cached bucket rule includes the determined location of the extracted header information,
   (1) identifying, with the second part of the computer system, a highest priority one of the cached wildcard rules, associated with the determined bucket rule, that includes the determined location of the extracted header information, and
   (2) applying, with the second part of the computer system, the identified highest priority one of the wildcard rules to the received packet to process the packet.

3. The computer-implemented of claim 2 further comprising:
for each of the wildcard rules,
   (1) determining, with the computer system, whether or not the D-dimensional area defined by a hyper-rectangle within an D-dimensional field space of packet header information of the wildcard rule is greater than a predetermined size, and
   (2) responsive to a determination that the D-dimensional area defined by a hyper-rectangle within an D-dimensional field space of packet header information of the wildcard rule is greater than a predetermined size, caching, with the computer system, the wildcard rule in the switch cache memory regardless of whether or not it is needed to process the packet.

4. The computer-implemented method of claim 2 wherein responsive to a determination there is no D-dimensional hyper-rectangle represented by any currently cached bucket rule that includes the determined location of the extracted header information, further (4) associating, with the computer system, a hard timer value with both the cached bucket rule and the cached wildcard rules associated with the identified bucket rule, and responsive to expiration of the hard timer of a cached rule or bucket rule, removing, with the computer system, the cached rule or bucket rule from the switch cache memory.

5. The computer-implemented method of claim 4 wherein the cached bucket rule is further associated with an idle timer value, and
wherein responsive to a determination that any D-dimensional hyper-rectangle represented by any currently cached bucket rule includes the determined location of the extracted header information, further (3) resetting, with the computer system, the idle timer value associated with the currently cached bucket rule including the determined location of the extracted header information.

6. The computer-implemented method of claim 1 wherein the act of partitioning the D-dimensional field space of packet header information into a plurality of D-dimensional hyper-rectangles, wherein each of the plurality of D-dimensional hyper-rectangles is represented by a bucket rule that can be stored in a switch cache memory, includes:
   1) receiving (i) a root node S representing a D-dimensional field space including all of the wildcard rules, and (ii) a bucket rule size bound N,
   2) determining a plurality of partition candidates ($c_i$) to partition the node along d dimensions,
   3) for each of a plurality of partition candidates ($c_i$)
      A) hypothetically partitioning the root node S on dimensions of the partition candidate $c_i$, and
      B) calculating a cost of the partition candidate $c_i$,
   4) identifying the one partition candidate $c_i$ from among the plurality of partition candidates having the lowest calculated partition cost,
   5) for the identified one partition candidate $c_i$ having the lowest calculated partition cost, append child nodes ($S_0^{c_i} \ldots S_{2^m-1}^{c_i}$) defined by the identified one partition candidate to the root node S, and
   6) for each of the resulting child nodes $S_k^{c_i}$
      A) determining whether or not the number of wildcard rules of the child node $S_k^{c_i}$ is less than or equal to the bucket size bound N,
      B) responsive to a determination that the number of wildcard rules of the child node $S_k^{c_i}$ is less than or equal to the bucket size bound N, define a bucket rule B as the D-dimensional space defined by the child node $S_k^{c_i}$ and
      C) otherwise, responsive to a determination that the number of wildcard rules of the child node $S_k^{c_i}$ is greater than the bucket size bound N, repeating acts (1)-(6) for the child node $S_k^{c_i}$ instead of the root node S.

7. The computer-implemented method of claim 1 wherein the switch cache memory is a TCAM.

8. The computer-implemented method of claim 1 wherein at least one of the at least one processor is one of (A) a microprocessor, (B) an application-specific integrated circuit and (C) a field programmable gate array.

9. The computer-implemented method of claim 1 wherein the act of associating, with the computer system, the wildcard rule with the bucket rule responsive to a determination that there is a point in the D-dimensional hyper-rectangle defined by the bucket rule such that the wildcard rule is the highest priority rule covering the point creates an association such that any wildcard rules associated with the same bucket rule are always cached together when the bucket rule is cached.

10. The computer-impelemented method of claim 1 wherein the bucket rules are non-overlapping in the D-dimensional field space, and wherein the acts of determining and associating avoid erroneous packet processing due to wildcard rule dependency.

11. A controller for guarantying correct packet matching to a set of wildcard rules for use in packet processing by a switch, while controlling a subset of the wildcard rules cached in the switch, the controller comprising:
  a) at least one non-transitory storage device having a first storage area storing the set of wildcard rules, each of the wildcard rules having (1) a rule priority value and (2) an associated D-dimensional area defined by a hyper-rectangle within a D-dimensional field space of packet header information, wherein D is at least 1;
  b) a bucket generation module configured to
    1) partition the D-dimensional field space of packet header information into a plurality of D-dimensional hyper-rectangles, wherein each of the plurality of D-dimensional hyper-rectangles is assigned to a single, unique bucket rule that can be stored in a switch cache memory, wherein there is a one-to-one assignment relationship between each of the plurality of D-dimensional hyper-rectangles and each of the bucket rules,
    2) determine, for each of the wildcard rules received and each of the bucket rules previously assigned to a corresponding unique one of the previously defined D-dimensional hyper-rectangles, whether or not there is a point in the D-dimensional hyper-rectangle defined by the bucket rule such that the wildcard rule is the highest priority rule covering the point, and
    3) associate, responsive to a determination that there is a point in the D-dimensional hyper-rectangle defined by the bucket rule such that the wildcard rule is the highest priority rule covering the point, the wildcard rule with the bucket rule, and otherwise not associate the wildcard rule with the bucket rule responsive to a determination that there is not a point in the D-dimensional hyper-rectangle defined by the bucket rule such that the wildcard rule is the highest priority rule covering the point,
  wherein the at least one non-transitory storage device has a second storage area storing generated bucket rules and their associated wildcard rules.

12. The controller of claim 11 wherein bucket generation module is configured to partition the D-dimensional field space of packet header information into a plurality of D-dimensional hyper-rectangles, wherein each of the plurality of D-dimensional hyper-rectangles is represented by a bucket rule that can be stored in a switch cache memory, by:
  A) receiving (i) a root node S representing a D-dimensional field space including all of the wildcard rules, and (ii) a bucket rule size bound N,
  B) determining a plurality of partition candidates ($c_i$) to partition the node along d dimensions,
  C) for each of a plurality of partition candidates ($c_i$),
    i) hypothetically partitioning the root node S on dimensions of the partition candidate $c_i$, and
    ii) calculating a cost of the partition candidate $c_i$,
  D) identifying the one partition candidate $c_i$ from among the plurality of partition candidates having the lowest calculated partition cost,
  E) for the identified one partition candidate $c_i$ having the lowest calculated partition cost, append child nodes ($S_0^{c_i} \ldots S_{2^m-1}^{c_i}$) defined by the identified one partition candidate to the root node S, and
  F) for each of the resulting child nodes $S_k^{c_i}$
    A) determining whether or not the number of wildcard rules of the child node $S_k^{c_i}$ is less than or equal to the bucket size bound N,
    B) responsive to a determination that the number of wildcard rules of the child node $S_k^{c_i}$ is less than or equal to the bucket size bound N, define a bucket rule B as the D-dimensional space defined by the child node $S_k^{c_i}$, and
    C) otherwise, responsive to a determination that the number of wildcard rules of the child node $S_k^{c_i}$ is greater than the bucket size bound N, repeating acts (1)-(6) for the child node $S_k^{c_i}$ instead of the root node S.

13. The controller of claim 11 wherein the bucket generation module is one of (A) a microprocessor, (B) an application-specific integrated circuit and (C) a field programmable gate array.

14. The controller of claim 11 wherein the act of associating, with the computer system, the wildcard rule with the bucket rule responsive to a determination that there is a point in the D-dimensional hyper-rectangle defined by the bucket rule such that the wildcard rule is the highest priority rule covering the point creates an association such that any wildcard rules associated with the same bucket rule are always cached together when the bucket rule is cached.

15. The controller of claim 11 wherein the bucket rules are non-overlapping in the D-dimensional field space, and wherein the acts of determining and associating avoid erroneous packet processing due to wildcard rule dependency.

16. A switch for applying wildcard rules to packets wherein in accordance with bucket rules and wildcard rules associated with the bucket rules, the switch comprising:
  a) a cache memory for storing at least some of the bucket rules and at least some of the wildcard rules, wherein each of the wildcard rules has (1) a rule priority value and (2) an associated D-dimensional area defined by a hyper-rectangle within a D-dimensional field space of packet header information;
  b) an input configured to receive a plurality of packets; and
  c) a packet processor including a first part and a second part, wherein the first part has more memory than the second part, but the second part can process packets faster than the first part, the packet processor being configured to
    1) extract header information from each of the received packets,
    2) determine a location of each of the extracted header information in D-dimensional field space,
    3) determine with the second part, for each of the received packets, whether or not any D-dimensional hyper-rectangle represented by any currently cached bucket rule includes the determined location of the extracted header information,
    4) responsive to a determination that there is no D-dimensional hyper-rectangle represented by any currently cached bucket rule that includes the determined location of the extracted header information for one of the plurality of packets,
      (A) request from the first part with the second part, a bucket rule representing the D-dimensional hyper-rectangle that includes the determined location,
      (B) receive from the first part with the first part, the requested bucket rule and any wildcard rules associated with the requested bucket rule, (C) cache with the second part, the received bucket rule,
(D) cache with the second part, the received wildcard rules associated with the received bucket rule,
(E) identify a highest priority one of the cached wildcard rules, associated with the determined bucket rule, that includes the determined location of the extracted header information, and
(F) apply the identified highest priority one of the wildcard rules to the one of the plurality of received packets to process the one of the plurality of received packets, and 5) responsive to a determination that any D-dimensional hyper-rectangle represented by any currently cached bucket rule includes the determined location of the extracted header information of another one of the plurality of received packets,
   (A) identify with the second part, a highest priority one of the cached wildcard rules, associated with the determined bucket rule, that includes the determined location of the extracted header information of the other one of the plurality of received packets, and
   (B) apply with the second part, the identified highest priority one of the wildcard rules to the other one of the plurality of received packets to process the other one of the plurality of received packets.

17. The switch of claim 16 wherein responsive to a determination there is no D-dimensional hyper-rectangle represented by any currently cached bucket rule that includes the determined location of the extracted header information, the packet processor further associates a hard timer value with both the cached bucket rule and the cached wildcard rules associated with the identified bucket rule, and
   responsive to expiration of the hard timer of a cached rule or bucket rule, removes the cached rule or bucket rule from the switch cache memory.

18. The switch of claim 17 wherein the cached bucket rule is further associated with an idle timer value, and
   wherein responsive to a determination that any D-dimensional hyper-rectangle represented by any currently cached bucket rule includes the determined location of the extracted header information, the packet processor further resets the idle timer value associated with the currently cached bucket rule including the determined location of the extracted header information.

19. The switch of claim 16 wherein the cache memory is a TCAM.

20. The switch of claim 16 wherein the packet processor is one of (A) a microprocessor, (B) an application-specific integrated circuit and (C) a field programmable gate array.

21. The switch of claim 16 wherein the bucket rules are non-overlapping in the D-dimensional field space.

* * * * *